United States Patent [19]
Negishi et al.

[11] Patent Number: 6,130,503
[45] Date of Patent: Oct. 10, 2000

[54] ELECTRON EMISSION DEVICE AND DISPLAY USING THE SAME

[75] Inventors: Nobuyasu Negishi; Takamasa Yoshikawa; Takashi Chuman; Kiyohide Ogasawara; Shingo Iwasaki; Hiroshi Ito, all of Tsurugashima, Japan

[73] Assignee: Pioneer Electronic Corporation, Tokyo, Japan

[21] Appl. No.: 09/032,111

[22] Filed: Feb. 27, 1998

[30] Foreign Application Priority Data

| Mar. 4, 1997 | [JP] | Japan | 9-049452 |
|---|---|---|---|
| Mar. 4, 1997 | [JP] | Japan | 9-049455 |
| Mar. 4, 1997 | [JP] | Japan | 9-049456 |
| Mar. 10, 1997 | [JP] | Japan | 9-118688 |
| Mar. 10, 1997 | [JP] | Japan | 9-118689 |
| Mar. 10, 1997 | [JP] | Japan | 9-118690 |
| May 15, 1997 | [JP] | Japan | 9-125956 |
| May 15, 1997 | [JP] | Japan | 9-125959 |
| May 23, 1997 | [JP] | Japan | 9-134122 |
| May 23, 1997 | [JP] | Japan | 9-134125 |
| May 23, 1997 | [JP] | Japan | 9-134126 |
| Jun. 12, 1997 | [JP] | Japan | 9-171002 |
| Jun. 12, 1997 | [JP] | Japan | 9-171003 |
| Aug. 8, 1997 | [JP] | Japan | 9-215138 |

[51] Int. Cl.$^7$ ............................................. H01J 1/62
[52] U.S. Cl. ........................ 313/495; 313/309; 313/310
[58] Field of Search .............................. 313/309, 310, 313/336, 351, 495

[56] References Cited

U.S. PATENT DOCUMENTS

| 3,706,920 | 12/1972 | Caldwell et al. | 317/234 R |
|---|---|---|---|
| 5,214,347 | 5/1993 | Gray | 313/309 |
| 5,936,257 | 8/1999 | Kusunoki et al. | 313/311 |

FOREIGN PATENT DOCUMENTS

| 798761 | 10/1997 | European Pat. Off. | H01J 31/12 |
|---|---|---|---|
| 5213744 | 10/1995 | Japan | H01J 1/30 |

OTHER PUBLICATIONS

Metal–insulator–metal and metal–insulator structures as electron sources, International Journal of Electronics. vol. 69, No. 1, Jul. 1, 1990, pp. 65–78.

R. R. Verderber, and J.G. Simmons, A Hot Electron, Cold Cathode, Emitter, The Radio and Electronic Engineer, vol. 33, Jun. 1967, pp. 347–351.

P.E. Troyan, R. B. Lubsanov, G.A. Vorobyev, S.A. Ghyngazov, I.V. Lakstroem, and S.S. Kramor, Flat display based in the metal–insulator–metal emitter array, Journal of Vacuum Science & Technology, part B, vol. 11 No. 2, Mar. 1, 1993 New York, US, pp. 514–517.

*Primary Examiner*—Vip Patel
*Attorney, Agent, or Firm*—Sughrue, Mion, Zinn, Macpeak & Seas, PLLC

[57] ABSTRACT

An electron emission device exhibits a high electron emission efficiency. The device includes an electron supply layer of metal or semiconductor, an insulator layer formed on the electron supply layer, and a thin-film metal electrode formed on the insulator layer. The insulator layer is made of a dielectric substance and has a film thickness of 50 nm or greater. When an electric field is applied between the electron supply layer and the thin-film metal electrode, the electron emission device emits electrons.

24 Claims, 28 Drawing Sheets

ENERGY-BAND

- ■ : FUSION SILICA
- □ : AMORPHOUS SiOx
- ▲ : PYREX
- △ : SiO
- ◆ : $Ta_2O_3$
- ◇ : $Al_2O_3$
- ◎ : SiC

- ■ : FUSION SILICA
- □ : AMORPHOUS SiOx
- ▲ : PYREX
- △ : SiO
- ◆ : $Ta_2O_3$
- ◇ : $Al_2O_3$
- ◎ : SiC

ELECTRON EMISSION DEVICE AND DISPLAY USING THE SAME

BACKGROUND OF THE INVENTION

1. Field of the Invention

The present invention relates to an electron emission device and an electron emission display device using the same.

2. Description of the Related Art

An FED (Field Emission Display) in field electron emission display apparatuses is known as a planar emission display equipped with an array of cold-cathode electron emission source which does not require cathode heating. For example, the emission principle of an FED using a spindt type cold cathode is in that electrons are drawn out from the cold cathode into a vacuum by the gate electrode located apart from the cold cathode in a similar manner of a CRT (Cathode Ray Tube) which has a cathode different from that of the FED, and then the electrons impinge onto the fluorescent substance that is coated on the transparent anode, thereby causing light emission.

However, this field emission source faces a problem of low production yield because the manufacture of the minute spindt type cold cathode is complex and involves many steps.

There also exists an electron emission device with a metal-insulator-metal (MIM) structure as a planar electron source. This electron emission device with an MIM structure has an aluminum (Al) layer as a cathode, an $Al_2O_3$ insulator layer of about 10 nm in film thickness and an Au layer, as an anode, of about 10 nm in film thickness formed in order on the substrate. With this device placed under an opposing electrode in a vacuum, when a voltage is applied between the underlying Al layer and the overlying Au layer and an acceleration voltage is applied to the opposing electrode, some of electrons leap out of the overlying Au layer and reach the opposing electrode. Even the electron emission device with an MIM structure does not yet provide a sufficient amount of emitted electrons. To improve this property of emission, it is considered that there is a necessity to make the $Al_2O_3$ insulator layer thinner by about several nanometers and make the quality of the membranous of the $Al_2O_3$ insulator layer and the interface between the $Al_2O_3$ insulator layer and the overlying Au layer more uniform.

To provide a thinner and more uniform insulator layer, for example, an attempt has been made to control the formation current by using anodization to thereby improve the electron emission characteristic, as in the invention described in Japanese Patent Application kokai No. Hei 7-65710.

However, even such an electron emission device with an MIM structure which is manufactured by this method still ensures a sufficient electron emission property of an emission current of about $1 \times 10^{-5}$ A/cm$^2$ and an electron emission efficiency (emission current/diode current) of about $1 \times 10^{-3}$. Since there is a difficulty in the method using anodization the electron emission device is not put to practical use yet. One of the factors influencing the device property of the electron emission device with an MIM structure is the quality and thickness of the insulator layer. It is considered that there is a necessity to make the insulator layer still thinner enough for occurrence of tunnel effect at i.e., about several nanometers in thickness. Therefore, pinholes are apt to appear in the insulator layer, so that the quality of film thereof is spoiled. Further one of the factors influencing the device property of the electron emission device with the MIM structure is the state of interface between the insulator layer and the metal layer. If the surface of the insulator layer after deposition is rough then the contact between the insulator layer and the metal layer becomes poor so as to make the electron emission unstable in the device.

SUMMARY OF THE INVENTION

Accordingly, it is an object of the present invention to provide an electron emission device with a high electron emission efficiency and an electron emission display apparatus using the same.

An electron emission device according to the invention comprises:

an electron supply layer of metal or semiconductor;

an insulator layer formed on the electron supply layer; and a thin-film metal electrode formed on the insulator layer and facing a vacuum space, characterized in that said insulator layer is made of a dielectric substance and has a film thickness of 50 nm or greater, whereby the electron emission device emits electrons when an electric field is applied between the electron supply layer and the thin-film metal electrode.

According to the electron emission device of the invention with the above structure, the insulator layer has a large thickness so that any holes are not likely to be produced, whereby the production yield is improved. The emission current of the electron emission device is greater than $1 \times 10^{-6}$ A/cm$^2$ and is approximately $1 \times 10^{-3}$ A/cm$^2$, and the electron emission efficiency obtained is $1 \times 10^{-1}$. Therefore, when this electron emission device is used in a display device, it can provide a high luminance, and suppress the consumption of the drive current to reduce the generation of heat, and can reduce a load on the driving circuit for the device.

The electron emission device of the invention is a planar or spot-like electron emission diode and can be adapted to high speed devices such as a source of a pixel vacuum tube or bulb, an electromagnetic emission source of an electron microscope, a vacuum-micro electronics device and the like. In addition, this electron emission device can serve as a light-emitting diode or a laser diode which emits electromagnetic waves of infrared rays, visible light or ultraviolet rays.

Moreover a display device using an electron emission device according to the invention comprises:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor; an insulator layer formed on the electron supply layer; and a thin-film metal electrode formed on the insulator layer and facing a vacuum space, wherein said insulator layer is made of a dielectric substance and has a film thickness of 50 nm or greater.

In addition, a display device using an electron emission device according to the invention comprises:

a pair of a device substrate and a transparent substrate facing each other with a vacuum space in between;

a plurality of ohmic electrodes formed in parallel on an inner surface of the device substrate;

a plurality of electron emission devices provided on the ohmic electrodes, each of the electron emission devices comprising an electron supply layer of metal or semiconductor; an insulator layer formed on the electron supply layer; and a thin-film metal electrode formed on the insulator layer and facing the vacuum space, wherein said insulator layer is made of a dielectric substance and has a film thickness of 50 nm or greater;

a plurality of bus electrodes formed on parts of the thin-film metal electrodes and extending in parallel to one another and perpendicular to the ohmic electrodes so as to electrically connect adjoining thin-film metal electrodes;

a plurality of collector electrodes provided in the transparent substrate; and fluorescent layers formed on the collector electrodes.

In an embodiment of the electron emission display device, the device further comprises a second auxiliary insulator layer with openings formed to separate the surfaces of the thin-film metal electrodes into a plurality of electron emission regions. The second auxiliary insulator layer covers the bus electrodes.

In an aspect of the invention, an electron emission device comprises:

an electron supply layer of metal or semiconductor;

an insulator layer formed on the electron supply layer; and a thin-film metal electrode formed on the insulator layer and facing a vacuum space, characterized in that said insulator layer is made of a dielectric substance with a dielectric constant of 8 or less and has a film thickness of 50 nm or greater, whereby the electron emission device emits electrons when an electric field is applied between the electron supply layer and the thin-film metal electrode.

In another aspect of the invention, an electron emission display device comprises:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor; an insulator layer formed on the electron supply layer; and a thin-film metal electrode formed on the insulator layer and facing a vacuum space, wherein said insulator layer is made of a dielectric substance with a dielectric constant of 8 or less and has a film thickness of 50 nm or greater.

In another aspect of the invention, an electron emission device comprises:

an electron supply layer of metal or semiconductor;

an insulator layer formed on the electron supply layer; and a thin-film metal electrode formed on the insulator layer and facing a vacuum space, characterized in that said insulator layer has a film thickness of 50 nm or greater and said electron supply layer is transparent, whereby the electron emission device emits electrons when an electric field is applied between the electron supply layer and the thin-film metal electrode.

In a further other aspect of the invention, an electron emission display device comprises:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor; an insulator layer formed on the electron supply layer; and a thin-film metal electrode formed on the insulator layer and facing a vacuum space, wherein said insulator layer has a film thickness of 50 nm or greater and said electron supply layer is transparent.

In an embodiment of the electron emission display device of the invention, said first substrate is transparent, and further comprising a transparent electrode which is disposed between said first substrate and said electron supply layer.

In another aspect of the invention, an electron emission device comprises:

an electron supply layer of metal or semiconductor;

an insulator layer formed on the electron supply layer; and a thin-film metal electrode formed on the insulator layer and facing a vacuum space, characterized in that said insulator layer is made of silicon oxide as a major component of $SiO_x$ where x represents an atomic ratio in a range of from 0.5 to 2 in a whole layer and has a film thickness of 50 nm or greater, whereby the electron emission device emits electrons when an electric field is applied between the electron supply layer and the thin-film metal electrode.

In a still further aspect of the invention, an electron emission device comprises:

an electron supply layer of metal or semiconductor;

an insulator layer formed on the electron supply layer; and a thin-film metal electrode formed on the insulator layer and facing a vacuum space, characterized in that said insulator layer is made of silicon oxide as a major component of $SiO_x$ where x represents an atomic ratio satisfying a refractive index in a range of from 1.3 to 3.0 and has a film thickness of 50 nm or greater, whereby the electron emission device emits electrons when an electric field is applied between the electron supply layer and the thin-film metal electrode.

In another aspect of the invention, an electron emission display device comprises:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor; an insulator layer formed on the electron supply layer; and a thin-film metal electrode formed on the insulator layer and facing a vacuum space, wherein said insulator layer is made of silicon oxide as a major component of $SiO_x$ where x represents an atomic ratio in a range of from 0.5 to 2 in a whole layer and has a film thickness of 50 nm or greater.

In another aspect of the invention, an electron emission display device comprises:

a pair of a device substrate and a transparent substrate facing each other with a vacuum space in between;

a plurality of ohmic electrodes formed in parallel on an inner surface of the device substrate;

a plurality of electron emission devices provided on the ohmic electrodes, each of the electron emission devices comprising an electron supply layer of metal or semiconductor; an insulator layer formed on the electron supply layer; and a thin-film metal electrode formed on the insulator layer and facing the vacuum space, wherein said insulator layer is made of silicon oxide as a major component of $SiO_x$ where x represents an atomic ratio in a range of from 0.5 to 2 in a whole layer and has a film thickness of 50 nm or greater;

a plurality of bus electrodes formed on parts of the thin-film metal electrodes and extending in parallel to one another and perpendicular to the ohmic electrodes so as to electrically connect adjoining thin-film metal electrodes;

a plurality of collector electrodes provided in the transparent substrate; and fluorescent layers formed on the collector electrodes.

In another aspect of the invention, an electron emission device comprises:

an electron supply layer of metal or semiconductor;

an insulator layer formed on the electron supply layer; and a thin-film metal electrode formed on the insulator layer and facing a vacuum space, characterized in that one of said thin-film metal electrode and said insulator layer is provided with a region containing atomic elements each having a work function which is lower than that of said thin-film metal electrode, whereby the electron emission device emits electrons when an electric field is applied between the electron supply layer and the thin-film metal electrode.

In an embodiment of the electron emission display of the invention, said region is an intermediate layer disposed between said thin-film metal electrode and said insulator layer.

In another embodiment of the electron emission display of the invention, said region is an electron emission layer disposed on an outer surface of said thin-film metal electrode at a side of electron emission.

In a further embodiment of the electron emission display of the invention, said region is disposed so as to be dispersed as a layer within said thin-film metal electrode.

In a still further embodiment of the electron emission display of the invention, said region is disposed so as to be dispersed as a layer within said insulator layer.

In an aspect of the invention, an electron emission display device comprises:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor; an insulator layer formed on the electron supply layer; and a thin-film metal electrode formed on the insulator layer and facing a vacuum space, wherein one of said thin-film metal electrode and said insulator layer is provided with a region containing atomic elements each having a work function which is lower than that of said thin-film metal electrode.

In another aspect of the invention, an electron emission device comprises:

an electron supply layer of metal or semiconductor;

an insulator layer formed on the electron supply layer; and a thin-film metal electrode formed on the insulator layer and facing a vacuum space, characterized in that said insulator layer has a film thickness of 50 nm or greater and is provided with one or more thermal conductive layers, whereby the electron emission device emits electrons when an electric field is applied between the electron supply layer and the thin-film metal electrode. An advantage of the invention is in that the thermal conductive layer in the insulator layer restricts a thermal distribution to improve stableness and life of the device in use.

In a further aspect of the invention, an electron emission display device comprises:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor; an insulator layer formed on the electron supply layer; and a thin-film metal electrode formed on the insulator layer and facing a vacuum space, wherein said insulator layer has a film thickness of 50 nm or greater and is provided with one or more thermal conductive layers.

In an aspect of the invention, an electron emission device comprises:

an electron supply layer of metal or semiconductor;

an insulator layer formed on the electron supply layer; and a thin-film metal electrode formed on the insulator layer and facing a vacuum space, characterized in that said insulator layer is made of a dielectric substance and has a film thickness of 50 nm or greater which is formed through a sputtering by using a mixture gas essentially comprising a rare gas under a sputtering condition of a gas pressure of 0.1 to 100 mTorr and a forming rate of 0.5 to 100 nm/min, whereby the electron emission device emits electrons when an electric field is applied between the electron supply layer and the thin-film metal electrode.

In another aspect of the invention, an electron emission display device comprises:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor; an insulator layer formed on the electron supply layer; and a thin-film metal electrode formed on the insulator layer and facing a vacuum space, wherein said insulator layer is made of a dielectric substance and has a film thickness of 50 nm or greater which is formed through a sputtering by using a mixture gas essentially comprising a rare gas under a sputtering condition of a gas pressure of 0.1 to 100 mTorr and a forming rate of 0.5 to 100 nm/min.

In a further aspect of the invention, an electron emission display device comprises:

a pair of a device substrate and a transparent substrate facing each other with a vacuum space in between;

a plurality of ohmic electrodes formed in parallel on an inner surface of the device substrate;

a plurality of electron emission devices provided on the ohmic electrodes, each of the electron emission devices comprising an electron supply layer of metal or semiconductor; an insulator layer formed on the electron supply layer; and a thin-film metal electrode formed on the insulator layer and facing the vacuum space, wherein said insulator layer is made of a dielectric substance and has a film thickness of 50 nm or greater which is formed through a sputtering by using a mixture gas essentially comprising a rare gas under a sputtering condition of a gas pressure of 0.1 to 100 mTorr and a forming rate of 0.5 to 100 nm/min;

a plurality of bus electrodes formed on parts of the thin-film metal electrodes and extending in parallel to one another and perpendicular to the ohmic electrodes so as to electrically connect adjoining thin-film metal electrodes;

a plurality of collector electrodes provided in the transparent substrate; and fluorescent layers formed on the collector electrodes.

In an aspect of the invention, an electron emission device comprises:

an electron supply layer of metal or semiconductor;

an insulator layer formed on the electron supply layer; and a thin-film metal electrode formed on the insulator layer and facing a vacuum space, characterized in that said insulator layer has a smoothed surface layer for contacting with said thin-film metal electrode, whereby the electron emission device emits electrons when an electric field is applied between the electron supply layer and the thin-film metal electrode.

In an embodiment of the electron emission device of the invention, said insulator layer is made of a dielectric substance and has a film thickness of 50 nm or greater which is formed through a sputtering method under a sputtering condition in which a gas pressure or a forming rate for said surface layer of said insulator layer is lower than that for a portion other than said surface layer of said insulator layer.

In another embodiment of the electron emission device of the invention, said insulator layer is made of a dielectric substance and has a film thickness of 50 nm or greater which is formed through a sputtering method by using a mixture gas essentially comprising a rare gas in such a manner that a portion other than said surface layer of said insulator layer is deposited under a sputtering condition of a gas pressure of 2 to 100 mTorr and a forming rate of 0.1 to 100 nm/min before said surface layer of said insulator layer is deposited under a sputtering condition of a gas pressure of 0.1 to 1 mTorr and a forming rate of 0.1 to 100 nm/min.

In a further embodiment of the electron emission device of the invention, said insulator layer is made of a dielectric substance and has a film thickness of 50 nm or greater which is formed through a sputtering method by using a mixture gas essentially comprising a rare gas in such a manner that a portion other than said surface layer of said insulator layer is deposited under a sputtering condition of a gas pressure of 0.1 to 100 mTorr and a forming rate of 20 to 100 nm/min before said surface layer of said insulator layer is deposited under a sputtering condition of a gas pressure of 0.1 to 100 mTorr and a forming rate of 0.1 to 10 nm/min.

In a still further embodiment of the electron emission device of the invention, said mixture gas contains xenon or krypton.

In a still further embodiment of the electron emission device of the invention, an electric resistance of said surface layer for contacting with said thin-film metal electrode is higher than that of a portion other than said surface layer of said insulator layer.

In a still further embodiment of the electron emission device of the invention, an electric resistance of said surface layer for contacting with said thin-film metal electrode is smoothed by a sputter-etching.

In a still further embodiment of the electron emission device of the invention, said electron supply layer is made of silicon and said insulator is made of silicon oxide.

In another aspect of the invention, an electron emission display device comprises:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor; an insulator layer formed on the electron supply layer; and a thin-film metal electrode formed on the insulator layer and facing a vacuum space, wherein said insulator layer has a smoothed surface layer for contacting with said thin-film metal electrode.

An advantage of the invention is in that the smoothed surface layer for contacting with the thin-film metal electrode in the insulator layer secures an electric connection therebetween for uniformly making an electric field applied to the insulator layer to improve the stableness of electron emission property of the device. The smoothing treatment is achieved by a sputtering method under a sputtering condition in which a gas pressure or a forming rate for the surface layer of the insulator layer is lower than that for a portion other than the surface layer of the insulator layer.

DETAILED DESCRIPTION OF THE PREFERRED EMBODIMENTS

Preferred embodiments according to the present invention will be described in more detail with reference to the accompanying drawings.

<Electron Emission Device with a Thick Insulator Layer>

Figure 1:
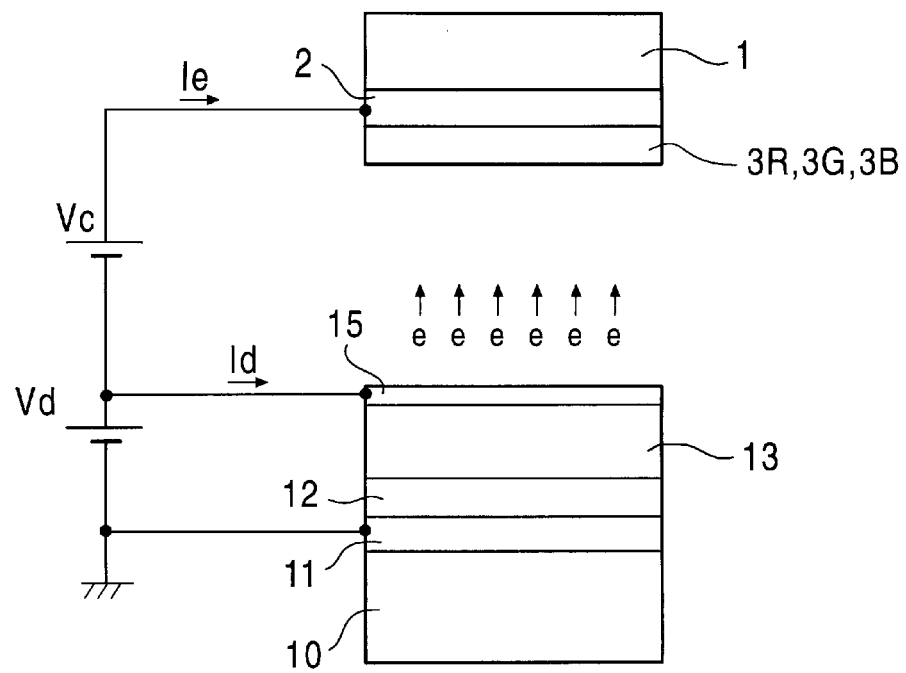
FIG. 1 is a schematic cross-sectional view of an electron emission device of an embodiment according to the invention.

As shown in FIG. 1, an electron emission device embodying the invention has an ohmic electrode 11 of Al previously formed on a device substrate 10. The electron emission device has also an electron supply layer 12 of metal or semiconductor such as Si or the like, an insulator layer 13 of $SiO_x$ such as $SiO_2$ or the like and a thin-film metal electrode 15 of metal such as Au facing a vacuum space which are layered or formed on the ohmic electrode in the described order. A pair of the device substrate 10 of a first substrate and a the transparent substrate 1 are supported so as to face each other sandwiching a vacuum space therebetween. On the internal surface of the transparent substrate 1, a transparent collector electrode 2 and a fluorescent layer 3R, 3G or 3B of fluorescent substance are formed in turn.

The insulator layer 13 is made of a dielectric substance and has a very large film thickness of 50 nm or greater. The electron emission device can be regarded as a diode of which the thin-film metal electrode 15 at its surface is connected to a positive potential Vd and the back, i.e., ohmic electrode 11 is connected to a ground potential. The electron emission device emits electrons when an electric field is applied between the electron supply layer and the thin-film metal electrode. When the driving voltage Vd is applied between the ohmic electrode 11 and the thin-film metal electrode 15 to supply electrons into the electron supply layer 12, a diode current Id flows. Since the insulator layer 13 has a high resistance, most of the applied electric field is applied to the insulator layer 13. The electrons travel inside the insulator layer 13 toward the thin-film metal electrode 15. Some of the electrons that reach near the thin-film metal electrode 15 tunnel through the thin-film metal electrode 15, due to the strong field, to be discharged out into the vacuum space.

The electrons e (emission current Ie) discharged from the thin-film metal electrode 15 by the tunnel effect are accelerated by a high voltage Vc which is applied to the opposing transparent collector electrode 2, and is collected at the collector electrode 2. When the fluorescent substance is coated on the collector electrode 2, corresponding visible light is emitted.

While Si is particularly effective as a material for the electron supply layer 12 of the electron emission device, an elemental semiconductor or a compound semiconductor of an element of a group IV, a group III–V, a group II–VI or the like, such as a germanium (Ge), silicon carbide (SiC), gallium arsenide (GaAs), indium phosphide (InP), or cadmium selenide (CdSe) can be used as well.

While metals such as Al, Au, Ag and Cu are effective as the electron supplying material, Sc, Ti, V, Cr, Mn, Fe, Co, Ni, Zn, Ga, Y, Zr, Nb, Mo, Tc, Ru, Rh, Pd, Cd, Ln, Sn, Ta, W, Re, Os, Ir, Pt, Tl, Pb, La, Ce, Pr, Nd, Pm, Sm, Eu, Gd, Tb, Dy, Ho, Er, Tm, Yb, Lu and the like can be used as well.

Silicon oxide $SiO_x$ (wherein subscribed x represents an atomic ratio) is effective as the dielectric material of the insulator layer 13 and, metal oxides or metal nitrides such as $LiO_x$, $LiN_x$, $NaO_x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $TiN_x$, $ZrO_x$, $ZrN_x$, $HfO_x$, $HfN_x$, $ThO_x$, $VO_x$, $VN_x$, $NbO_x$, $TaO_x$, $TaN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $TiO_x$, $TiN_x$, $SiN_x$, $GeO_x$, $SnO_x$, $PbO_x$, $PO_x$, $PN_x$, $AsO_x$, $SbO_x$, $SeO_x$, $TeO_x$ and the like can be used as well. Furthermore, metal complex oxides such as $LiAlO_2$, $Li_2SiO_3$, $Li_2TiO_3$, $Na_2Al_{22}O_{34}$, $NaFeO_2$, $Na_4SiO_4$, $K_2SiO_3$, $K_2TiO_3$, $K_2WO_4$, $Rb_2CrO_4$, $Cs_2CrO_4$, $MgAl_2O_4$, $MgFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_{41}$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_5$, $FeTiO_3$, $MgTiO_3$, $NaSiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2\text{-}Sb_2O_3$, $CuSeO_4$, $Na_2SeO_3$, $ZnSeO_3$, $K_2TeO_3$, $K_2TeO_4$, $Na_2TeO_3$, $Na_2TeO_4$ and the like can be used as well and still furthermore, sulfides such as FeS, $Al_2S_3$, MgS, ZnS and the like, fluorides such as LiF, $MgF_2$, $SmF_3$ and the like, chlorides such as HgCl, $FeCl_2$, $CrCl_3$ and the like, bromides such as AgBr, CuBr, $MnBr_2$ and the like, iodide such as $PbI_2$, CuI, $FeI_2$ and the like and metal oxidized nitrides such as SiAlON and the like can be used as well for the insulator layer.

Moreover, carbon such as diamond, Fulleren ($C_{2n}$) and the like or metal carbide such as $Al_4C_3$, $B_4C$, $CaC_2$, $Cr_3C_2$, $Mo_2C$, MoC, NbC, SiC, TaC, TiC, VC, $W_2C$, WC, ZrC and the like are also effective as the dielectric material of the insulator layer 13. Fulleren ($C_{2n}$) consists of carbon atoms. The representative $C_{60}$ is a spherical surface basket molecule as known a soccer ball molecule. There is also known $C_{32}$ to $C_{960}$ and the like. The subscribed x in $O_x$, $N_x$ and the like in the above chemical formulas represent atomic ratios and also herein after.

The film thickness of the insulator layer 13 may be 50 nm or greater preferably 100 to 1000 nm and more preferably 100 to 700 nm.

Metals Pt, Au, W, Ru and Ir are effective as the material for the thin-film metal electrode 15 on the electron emission side. In addition, Al, Sc, Ti, V, Cr, Mn, Fe, Co, Ni, Cu, Zn, Ga, Y, Zr, Nb, Mo, Tc, Rh, Pd, Ag, Cd, Ln, Sn, Ta, Re, Os, Tl, Pb, La, Ce, Pr, Nd, Pm, Sm, Eu, Gd, Tb, Dy, Ho, Er, Tm, Yb, Lu and the like can be used as well for the thin-film metal electrode.

The material for the device substrate 10 may be ceramics such as $Al_2O_3$, $Si_3N_4$ or BN instead of glass.

Although sputtering is particularly effective in forming those layers and the substrate, vacuum deposition, CVD (Chemical Vapor Deposition), laser aberration, MBE (Molecular Beam Epitaxy) and ion beam sputtering are also effective.

Electron emission devices according to the invention were fabricated and their characteristics were examined concretely.

An electron supply layer of silicon (Si) was formed at 5000 nm thick, by sputtering, on an electrode surface of a device substrate 10 of glass on which an ohmic electrode of Al was previously formed 300 nm thick by sputtering. A plurality of Si substrates of this type were prepared.

Then, insulator layers of $SiO_2$ were formed on the electron supply layers of the Si substrates by sputtering respectively while changing the film thickness thereof in a range from 0 nm to 500 nm. Thus a plurality of $SiO_2$-insulator substrates were provided. Each $SiO_2$ insulator layer was formed by sputtering by using a gas of Ar, Kr or Xe or a mixture thereof, or a gas mixture essentially consisting of one of those rare gases with $O_2$, $N_2$, $H_2$ or the like mixed therein, under the sputtering conditions of a gas pressure of 0.1 to 100 mTorr, preferably 0.4 to 40 mTorr and the forming rate of 0.1 to 1000 nm/min, preferably 0.5 to 100 nm/min. The used target was made of $SiO_2$. The material such as SiO, Si or a composite thereof may be used for the target of sputtering. An RF supply may be used for a non-conductive target, and the RF or DC supply may be used for a conductive target. The sputtering device was controlled by properly altering the sputtering target and sputtering conditions in order to obtain a single layer or multilayer structure, the amorphous or crystal phase, the grain size and the atomic ratio of the goal insulator layer 13.

The analysis on the $SiO_2$ insulator layer in this embodiment by using an X-ray diffraction was performed and then the result showed some diffraction intensity Ic caused by the crystal portion and some halo intensity Ia caused by the amorphous phase. It can be assumed from this result that $SiO_2$ of the insulator layer consists of a dispersed polycrystal portion and an amorphous phase portion.

Finally, a thin-film metal electrode of Pt was formed at a 10 nm thick on the surface of the amorphous $Si_2$ layer of each substrate by sputtering, thus providing plural device substrates.

Meanwhile, transparent substrates were prepared, each of which has an ITO collector electrode formed inside a transparent glass substrate and has a fluorescent layer of a fluorescent substance corresponding to R, G or B color emission formed on the collector electrode by the normal scheme.

Electron emission devices were assembled in each of which the device substrate and the transparent substrate are supported apart from one another by 10 mm in parallel by a spacer in such a way that the thin-film metal electrode 15 faced the collector electrode 2, with the clearance therebetween made to a vacuum of $10^{-7}$ Torr or $10^{-5}$ Pa.

Then, the diode current Id and the emission current Ie corresponding to the thickness of the $SiO_2$ film of each of the acquired plural devices were measured.

Figure 2:
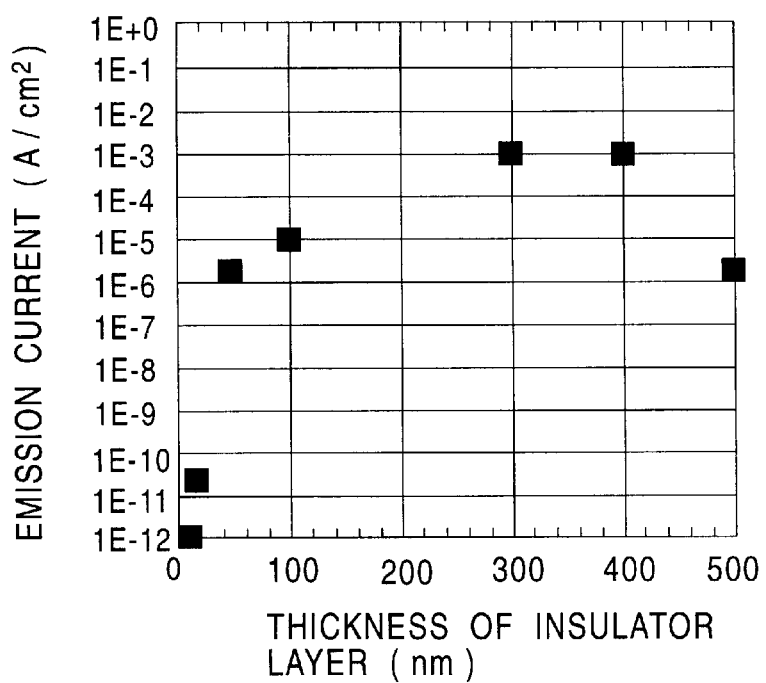
FIG. 2 is a graph illustrating a dependency of the electron emission current on the film thickness of an $SiO_2$ layer in the electron emission device in an embodiment of the invention.
Figure 3:
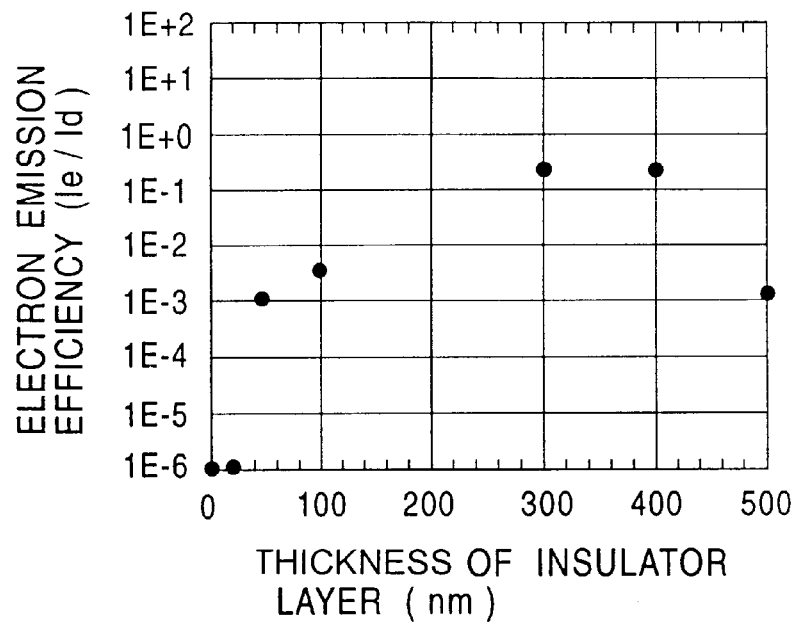
FIG. 3 is a graph showing a dependency of the electron emission efficiency on the film thickness of the $SiO_2$ layer in the electron emission device in the embodiment of the invention.

FIGS. 2 and 3 show the relationships between the film thickness of each $SiO_2$ layer and the maximum emission current Ie, and between the film thickness and the maximum electron emission efficiency (Ie/Id) for each film thickness respectively when a driving voltage Vd of 0 to 200 V was applied to the prepared electron emission devices. As apparent from FIGS. 2 and 3, while the emission current and the electron emission efficiency were saturated from the thickness of 50 nm, the devices whose $SiO_2$ layers had thicknesses of 300 to 400 nm showed the maximum emission current of about $1\times10^{-3}$ $A/cm^2$ and the maximum electron emission efficiency of about $1\times10^{-1}$.

It is understood from those results that by applying a voltage of 200 V or lower, the emission current of $1\times10^{-6}$ $A/cm^2$ or greater and the electron emission efficiency of $1\times10^{-3}$ or greater can be acquired from an electron emission device which has an $SiO_2$ dielectric layer 50 nm or greater in thickness, preferably 100 to 400 nm in thickness.

With a voltage of approximately 4 kV applied between the fluorescent-substance coated collector electrode and the thin-film metal electrode, a uniform fluorescent pattern corresponding to the shape of the thin-film metal electrode was observed in the devices whose $SiO_2$ layers have thicknesses of 50 nm or greater. This shows that the electron emission from the amorphous $SiO_2$ layer is uniform and has a high linearity, and that those devices can serve as an electron emission diode, or a light-emitting diode or laser diode which emits electromagnetic waves of infrared rays, visible light or ultraviolet rays.

Next, various electron emission devices were manufactured through the same manner as the above embodiments except that the insulator layers each having a 400 nm thickness were formed while controlling the sputter conditions of the mixture gas pressure or the forming rate i.e., deposition rate of $SiO_2$ respectively. There were measured the diode current Id and the emission current Ie corresponding to the mixture gas pressure or the forming rate i.e., deposition rate of $SiO_2$.

Figure 4:
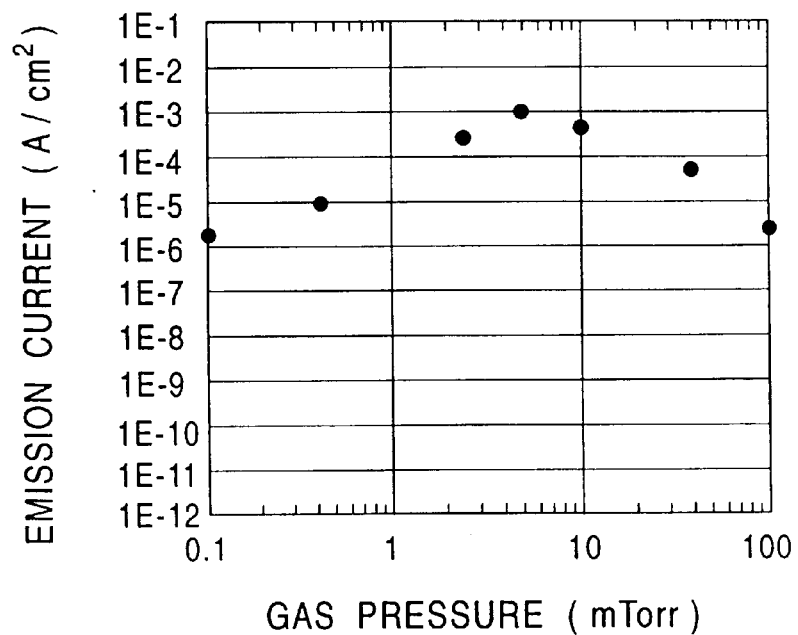
FIG. 4 is a graph illustrating a dependency of the electron emission current on the gas pressure in the electron emission device in another embodiment of the invention.
Figure 5:
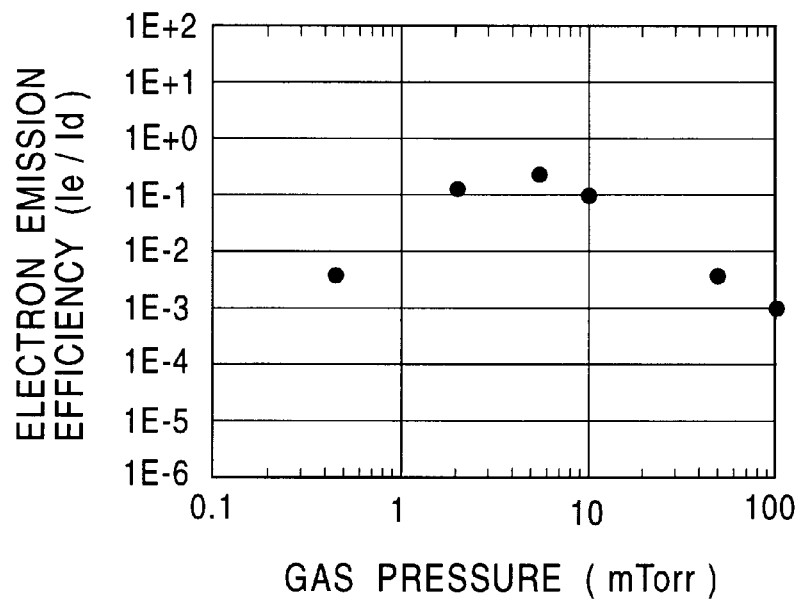
FIG. 5 is a graph showing a dependency of the electron emission efficiency on the gas pressure in the electron emission device in another embodiment of the invention.

FIGS. 4 and 5 show the relationships between the gas pressure for deposition of $SiO_2$ and both the maximum emission current Ie and the maximum electron emission efficiency (Ie/Id) respectively. As seen from these Figures, it is understood that the emission current of $1\times10^{-6}$ $A/cm^2$ or greater and the electron emission efficiency of $1\times10^{31\ 3}$ or greater can be acquired from an electron emission device which has an $SiO_2$ insulator layer formed at a gas pressure of 0.1 to 100 mTorr.

Figure 6:
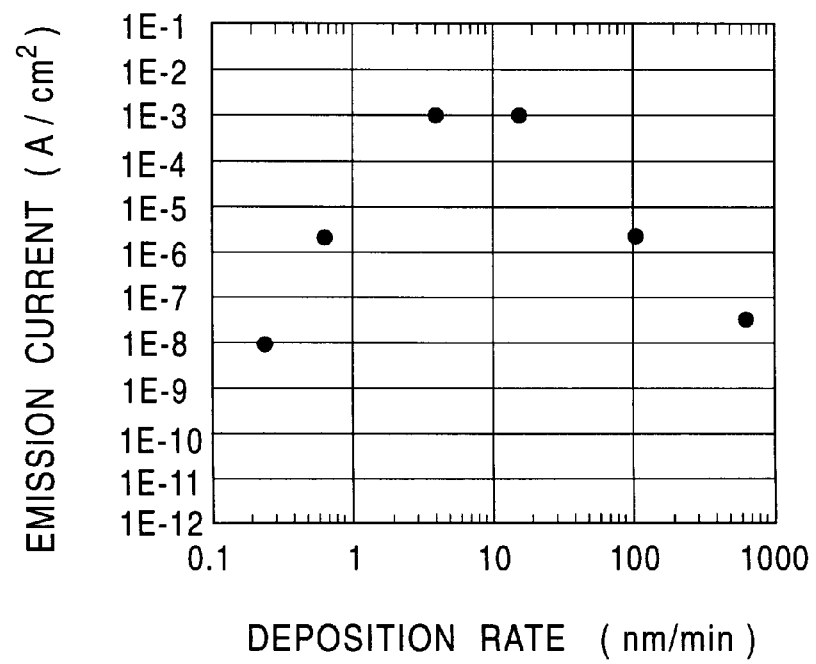
FIG. 6 is a graph illustrating a dependency of the electron emission current on the deposition rate in the electron emission device in another embodiment of the invention.
Figure 7:
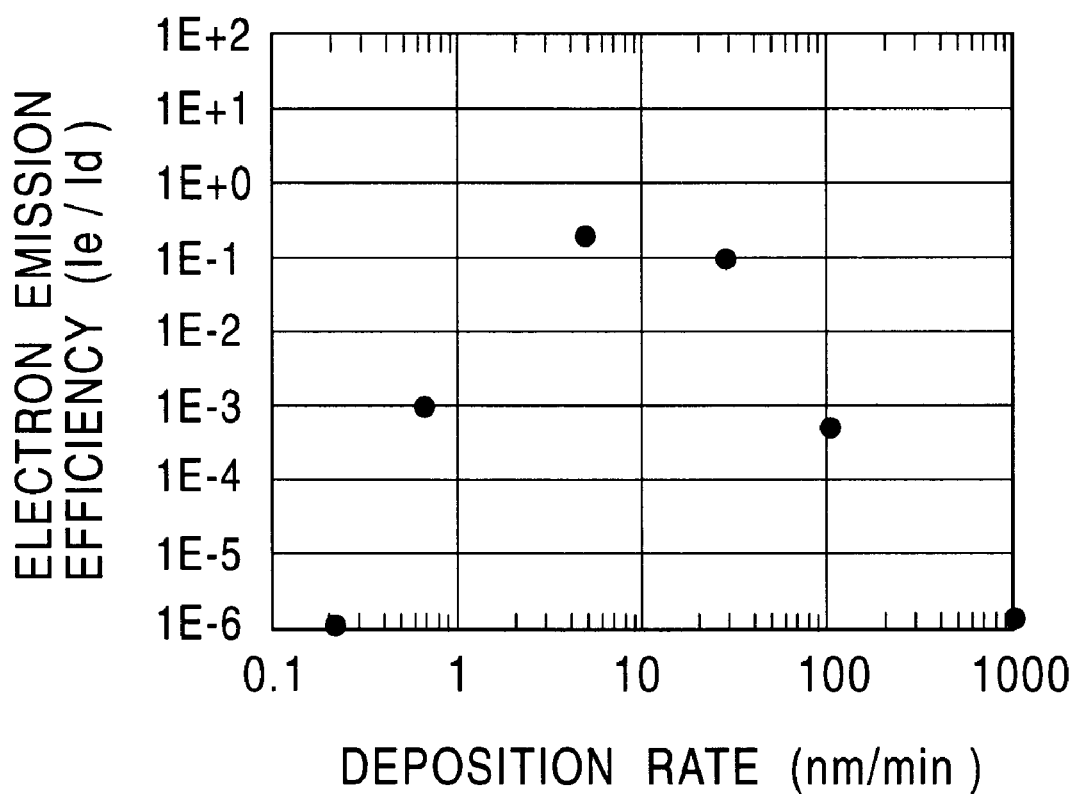
FIG. 7 is a graph showing a dependency of the electron emission efficiency on the deposition rate in the electron emission device in another embodiment of the invention.

FIGS. 6 and 7 show the relationships between the deposition rate of $SiO_2$ layer and both the maximum emission current Ie and the maximum electron emission efficiency (Ie/Id) respectively. As seen from these Figures, it is understood that the emission current of $1\times10^{-6}$ $A/cm^2$ or greater and the electron emission efficiency of $1\times10^{-3}$ or greater can be acquired from an electron emission device which has an $SiO_2$ insulator layer formed at a deposition rate of 0.5 to 100 nm/min.

Figure 8:
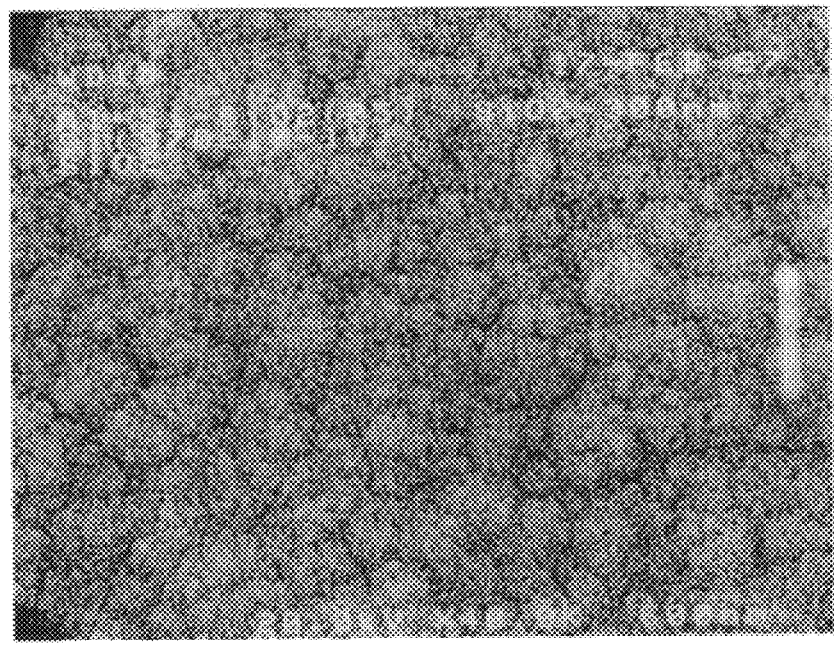
FIG. 8 is an SEM photograph showing a surface of an insulator layer deposed by the sputtering method for an embodiment of the invention in which a particle structure appears.
Figure 9:
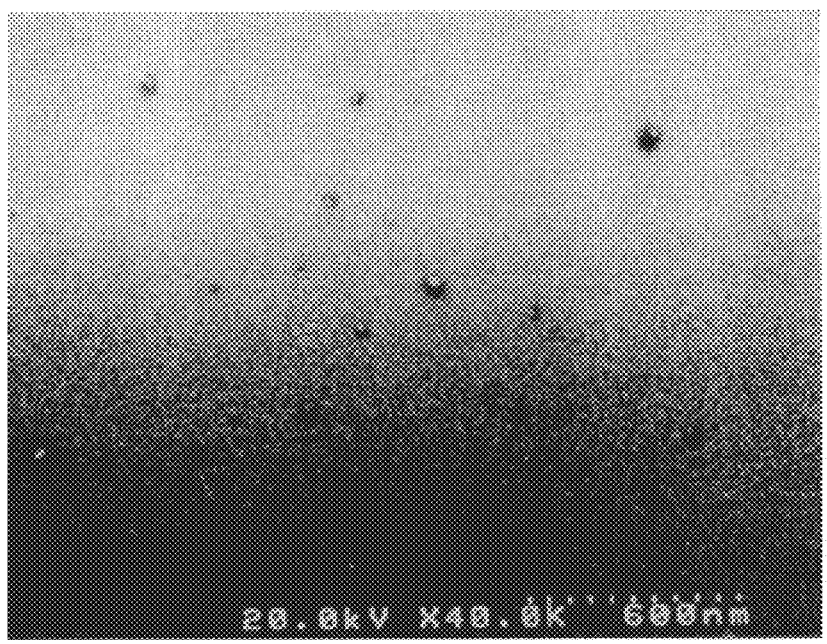
FIG. 9 is an SEM photograph showing a surface of an insulator layer deposed by a CVD method for a comparative.

When there were observations of the surface of the $SiO_2$ insulator layer by a scanning electron microscope (SEM) during the above formation process, grain surface each having an about 20 nm diameter appeared in comparison with that formed by CVD. FIGS. 8 and 9 are SEM photographs showing surfaces of insulator layers deposed by the sputtering method and the CVD method respectively.

Figure 10:
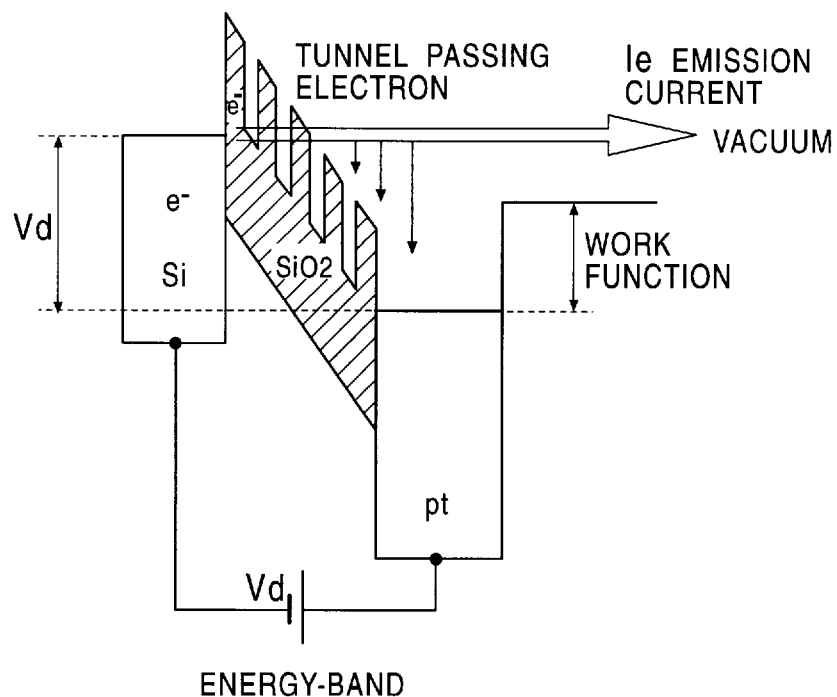
FIG. 10 is an energy band diagram illustrating a large thickness-insulator layer structure of an electron emission device according to the present invention.

The peculiar phenomenon that the tunnel current flows through the insulator layer which has a thickness of 50 nm or greater seems to be originated from the grain structure of $SiO_2$ of the insulator layer. As shown in FIG. 10, while $SiO_2$ is an insulator by nature, multiple bands with low potentials are caused by the grain structure defects adjacent thereto or impurities in the insulator layer. It is assumed that electrons tunnel through one low-potential band after another, and thus tunnel through the insulator layer of 50 nm or greater in thickness as a consequence.

<Smoothing of an Insulator Layer>

Figure 11:
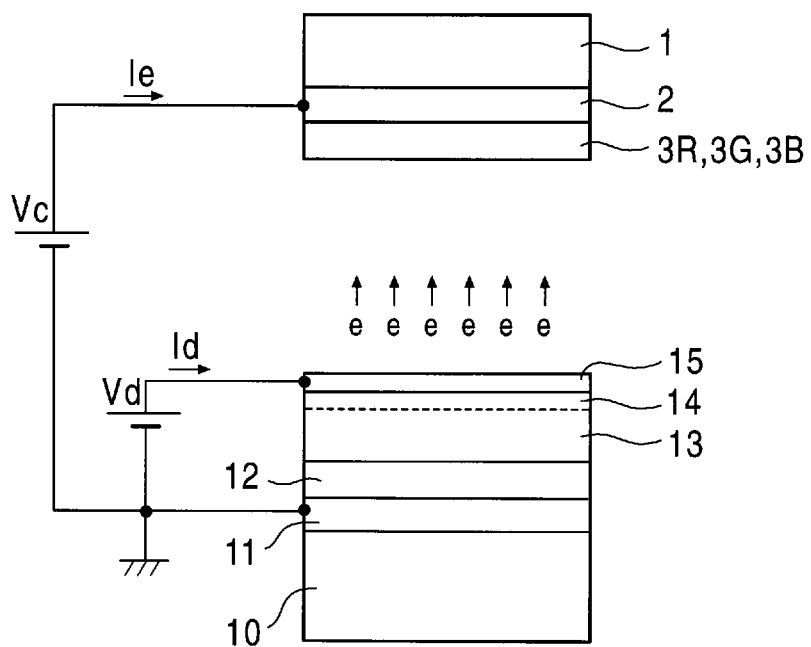
FIG. 11 is a schematic cross-sectional view showing an electron emission device of an embodiment according to the invention in which a surface layer is provided with the insulator layer.

As shown in FIG. 11, an electron emission device of this embodiment has an electron supply layer 12 of metal or semiconductor, an insulator layer 13, a surface layer 14 and a thin-film metal electrode 15 facing a vacuum space which are layered or formed in turn on an ohmic electrode 11 previously formed on a device substrate 10. The electron emission device emits electrons from the thin-film metal electrode 15 to the vacuum space when an electric field is applied between the electron supply layer 12 and the thin-film metal electrode 15. The surface layer 14 contacting with the thin-film metal electrode 15 has an about 5 nm thick and is smoothed. Concretely, the smoothing of the surface layer 14 included in the insulator layer 13 is achieved through a sputtering method under a sputtering condition in which a gas pressure or a forming rate for the surface layer of the insulator layer is lower than that for a portion other than the surface layer 14 in the insulator layer, as mentioned in detail later. The smoothed surface layer 14 is in a high density and has an electric resistance higher than that of the portion other than the surface layer 14 of the insulator layer.

Next, various electron emission devices were manufactured through the same manner as the above embodiments except the $SiO_2$ insulator layer 13 with the surface layer 14. The after steps of forming an electron supply layer was performed per one substrate as follows:

The $SiO_2$ insulator layer was formed on an electron supply layer by sputtering by using a gas of Ar, Kr or Xe or a mixture thereof, or a gas mixture essentially consisting of one of those rare gases with $O_2$, $N_2$, $H_2$ or the like mixed therein. Every $SiO_2$ insulator layer was formed in such a way that $SiO_2$ was firstly deposited on the electron supply layer 12 under sputtering conditions of a gas pressure of 2 to 100 mTorr and a forming rate of 0.1 to 100 nm/min preferably 0.5 to 100 nm/min until a predetermined thickness and was subsequently deposed as a surface layer at about 5 nm under sputtering conditions of a gas pressure of 0.1 to 1 mTorr and a the same forming rate. We observed the deposited surface of the $SiO_2$ insulator layer was with a scanning electron microscope (SEM), and then recognized the surface being as more smoothed as before. We measured an electric resistance values both of the deposited $SiO_2$ surface layer and a portion other than the surface layer of the insulator layer, so that the former was $1\times10^{15}$ Ωcm and the later was $1\times10^{13}$ Ωcm. It was understood that the electric resistance of the surface layer for contacting with the thin-film metal electrode is higher than that of the portion other than the surface layer of the insulator.

In addition, the high electric resistance of the surface layer is achieved by changing the deposition rate of $SiO_2$ instead of the gas pressure. Namely, the $SiO_2$ insulator layer may be deposited by the sputtering using a gas of Ar, Kr or Xe or a mixture thereof, or a gas mixture essentially consisting of one of those rare gases with $O_2$, $N_2$, $H_2$ or the like mixed therein under a first sputtering condition of a gas pressure of 0.1 to 100 mTorr and a forming rate of 20 to 100 nm/min for the portion other than the surface layer and a second sputtering condition of the same gas pressure and a forming rate of 0.1 to 10 nm/min for the $SiO_2$ surface layer with about 5 nm of the insulator layer.

The use of Ar for the sputter gas carries out the smoothing of the $SiO_2$ surface layer of the insulator layer in the sputtering process. Further, the use of mixture gas of rare gas containing partly or wholly xenon (Xe) or krypton (Kr) contributes the more fine smoothing of the surface layer.

In addition to the two-step sputtering above mentioned, the smoothing of the surface layer may be achieved by a sputter etching i.e., inverse sputtering so that, after depositing the $SiO_2$ insulator layer, the surface thereof is etched out by the inverse sputtering to form a smoothed surface on the insulator layer. The sputter etching may be performed by using a gas of Ar, Kr or Xe under sputtering condition of a gas pressure of 1 to 100 mTorr and an electric power of 50 to 1000 W in a time period of 1 to 60 minutes.

Finally, a thin-film metal electrode of Pt was formed at a 10 nm thick on the surface of the amorphous $SiO_2$ layer of each substrate by sputtering, thus providing plural device substrates.

Meanwhile, transparent substrates were prepared in such a manner that an ITO collector electrode was formed inside the transparent glass substrate and then a fluorescent layer was formed on the collector electrode by a normal scheme respectively.

Electron emission devices were assembled in each of which the device substrate and the transparent substrate are supported apart from one another by 10 mm in parallel by a spacer in such a way that the thin-film metal electrode 15 faced the collector electrode 2, with the clearance therebetween made to a vacuum of $10^{-7}$ Torr or $10^{-5}$ Pa.

Then, the diode current Id and the emission current Ie corresponding to the thickness of the $SiO_2$ film (insulator layer) of each of the acquired plural devices were measured.

Figure 12:
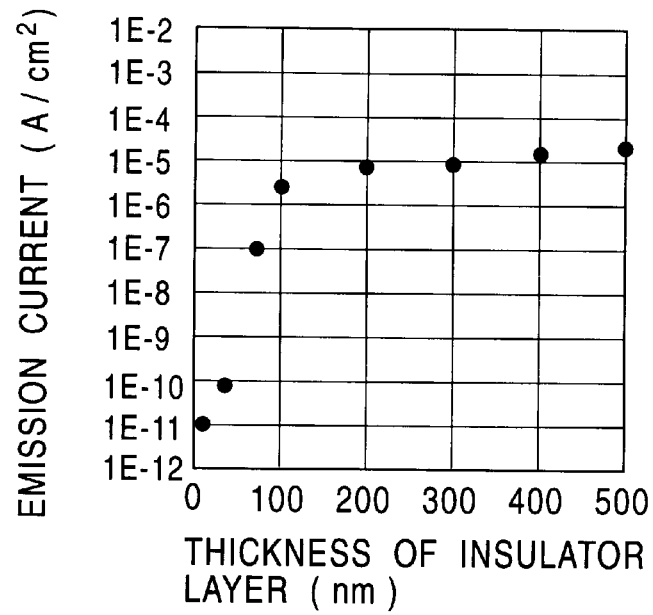
FIG. 12 is a graph illustrating a dependency of the electron emission current on the film thickness of an $SiO_2$ insulator layer in an electron emission device embodying the invention.
Figure 13:
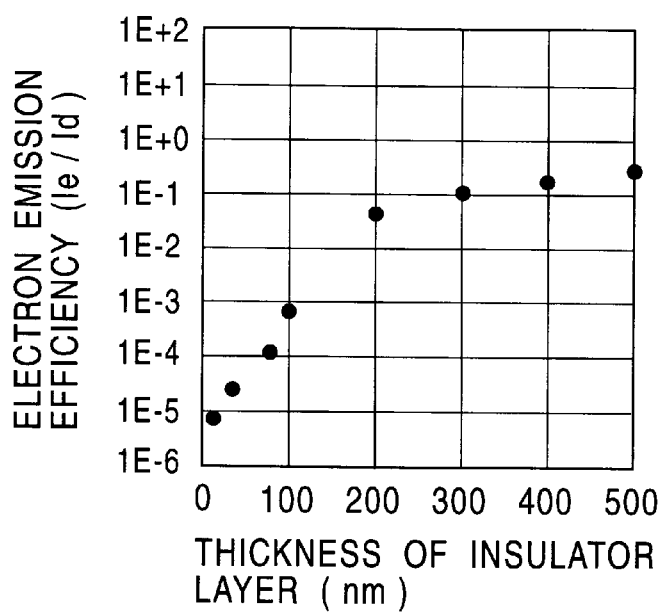
FIG. 13 is a graph showing a dependency of the electron emission efficiency on the film thickness of the $SiO_2$ insulator layer in the electron emission device embodying the invention.

FIGS. 12 and 13 show the relationships between the film thickness of each $SiO_2$ layer and the maximum emission current Ie, and between the film thickness and the maximum electron emission efficiency (Ie/Id) for each film thickness respectively when a driving voltage Vd of 0 to 200 V was applied across the thin-film metal electrode and ohmic electrode of a ground potential in each prepared electron emission device. As apparent from FIGS. 12 and 13, while the emission current and the electron emission efficiency were saturated from the thickness of 50 nm, the devices whose $SiO_2$ layers had thicknesses of 300 to 500 nm showed the maximum emission current of about $1\times10^{-5}$ A/cm$^2$ and the maximum electron emission efficiency of about $1\times10^{-1}$.

It is understood from those results that by applying a voltage of 200 V or lower, the emission current of $1\times10^{-6}$ A/cm$^2$ or greater and the electron emission efficiency of $1\times10^{-3}$ or greater can be acquired from an electron emission device which has an $SiO_2$ dielectric layer 50 nm or greater in thickness, preferably 100 to 500 nm in thickness.

Next, comparative electron emission devices were manufactured through the same manner as the above embodiments except the $SiO_2$ insulator layer 13 without smoothing. The emission currents Ie of the electron emission devices both of the embodiment and the comparative are measured.

Figure 14:
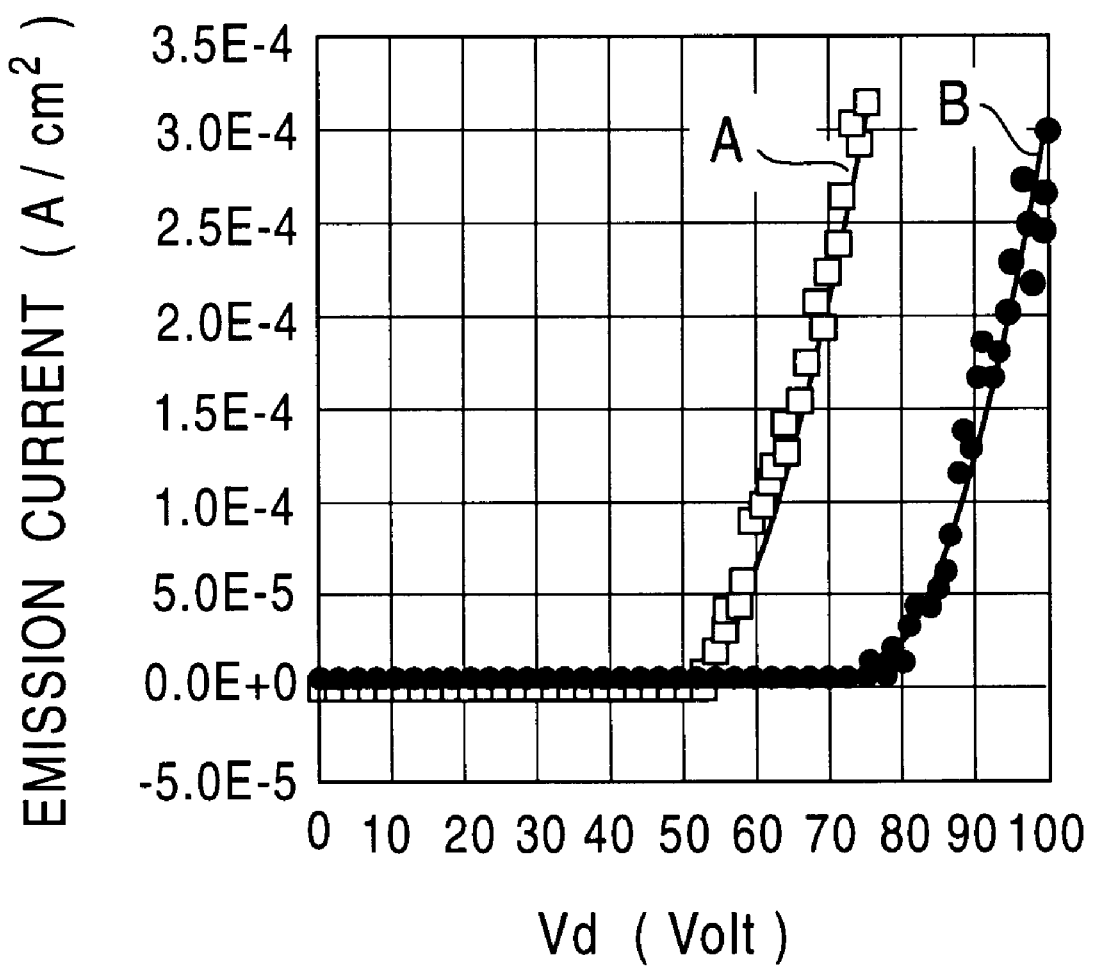
FIG. 14 is a graph illustrating a relationship between the emission current Ie and the driving voltage Vd applied for driving the electron emission device of an embodiment according to the invention together with that of a comparative electron emission device.

FIG. 14 shows a property relationship between the emission current Ie and the driving voltage Vd of the electron emission devices both of the embodiment and the comparative electron emission when a driving voltage Vd of 0 to 100 V was applied across the thin-film metal electrode and ohmic electrode of a ground potential in each prepared electron emission device. In Figure, the plots A denote a property of emission current of the device having the smoothed surface layer in the insulator layer and the plots B denote that of non-smoothed one. As seen from FIG. 14, the device having the smoothed insulator layer began to emit electrons at a driving voltage Vd of about 50 V and reached to an emission current Ie of $2\times10^{-4}$ A/cm$^2$ at a driving voltage Vd of about 70 V. In contrast, the device without any smoothed insulator layer began to emit electrons at a driving voltage Vd of about 70 V and reached to an emission current Ie of $2\times10^{-4}$ A/cm$^2$ at a driving voltage Vd of about 90 V. In this way, the smoothing of the insulator layer in the electron emission device provided to reduce the driving voltage for the device.

Figure 15A:
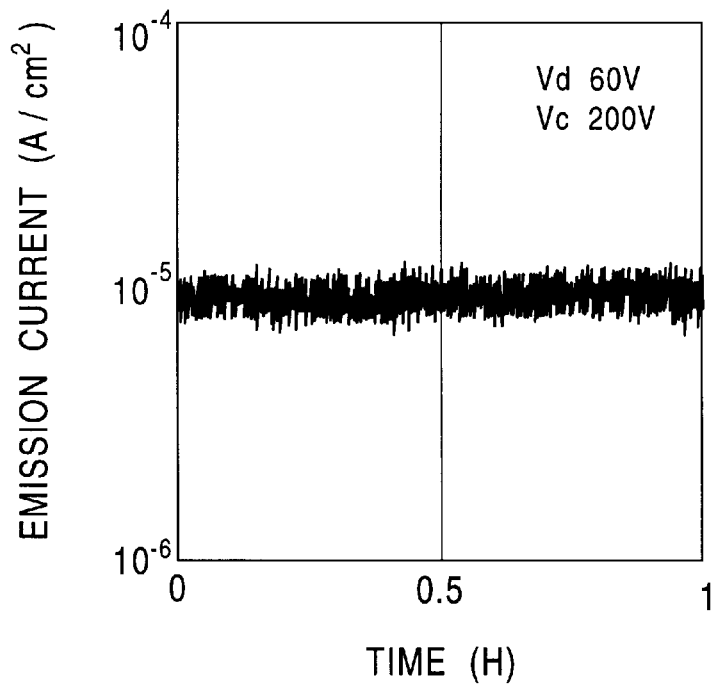
FIGS. 15A and 15B are graphs illustrating fluctuations of emission current with the lapse of time in the electron emission device of the embodiment and the comparative electron emission device respectively.
Figure 15B:
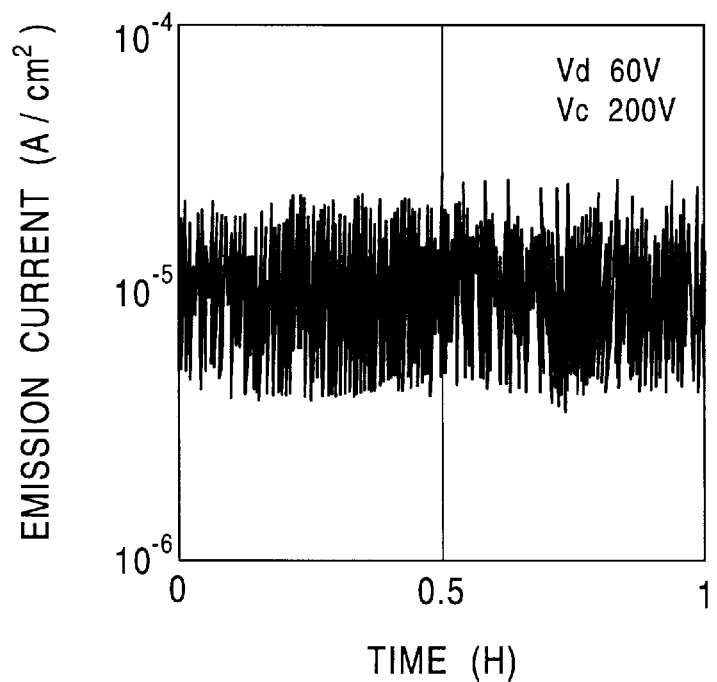

Moreover, fluctuations of the emission current Ie of the electron emission device both of the embodiment and the comparative are measured. FIG. 15A shows the fluctuation of emission current with the lapse of time in the electron emission device having a smoothed insulator layer and FIG. 15B shows the same of the comparative electron emission device having no smoothed insulator layer. As apparent from these Figures, the smoothing of the insulator layer in the electron emission device restricted the fluctuation of emission current to make the emission current Ie of the electron emission device stable.

<Oxygen Atomic Ratio of Insulator Layer>

Figure 16:
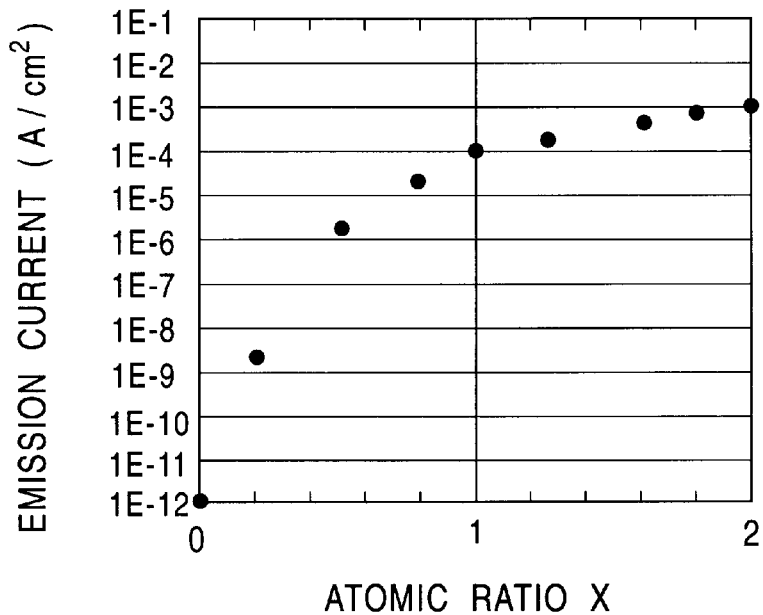
FIG. 16 is a graph illustrating a dependency of the electron emission current on the atomic ratio x of an $SiO_x$ layer in the electron emission device according to the invention.
Figure 17:
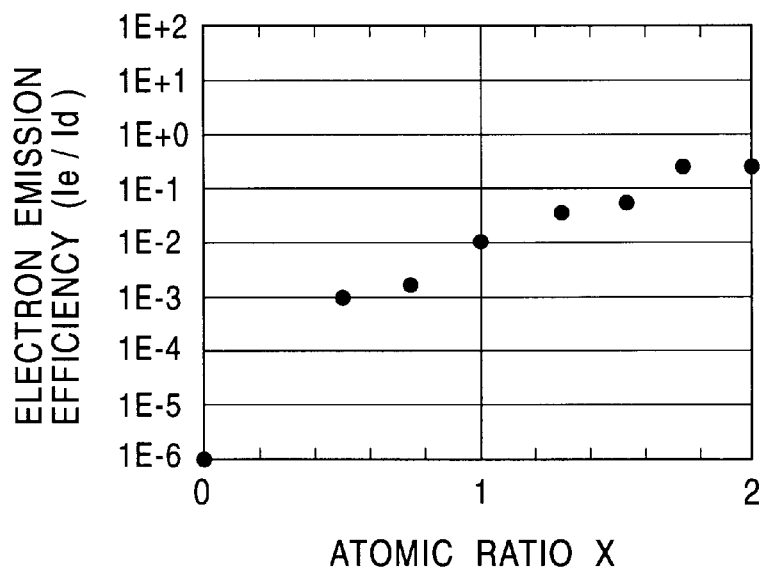
FIG. 17 is graph showing a dependency of the electron emission efficiency on the atomic ratio x of the $SiO_x$ layer in the electron emission device according to the invention.

Next, various electron emission devices were manufactured through the same manner as the above embodiment except that the atomic ratio x of oxygen (O) in SiO$_x$ of the insulator layers each having a 400 nm thickness is changed by controlling the sputter conditions. There were measured the diode current Id and the emission current Ie corresponding to the oxygen atomic ratio x FIGS. 16 and 17 show the relationships between the oxygen atomic ratio x of SiO$_x$ layer and both the maximum emission current Ie and the maximum electron emission efficiency (Ie/Id) respectively. As seen from these Figures, it is understood that the emission current of $1\times10^{-6}$ A/cm$^2$ or greater and the electron emission efficiency of $1\times10^{-3}$ or greater can be acquired from an electron emission device which has an insulator layer of amorphous SiO$_x$ having an oxygen atomic ratio x of 0.5 to 2.

<Refractive Index of Insulator Layer>

Furthermore, the forgoing electron emission devices were measured the diode current Id and the emission current Ie corresponding to the refractive index of the insulator layer.

Figure 18:
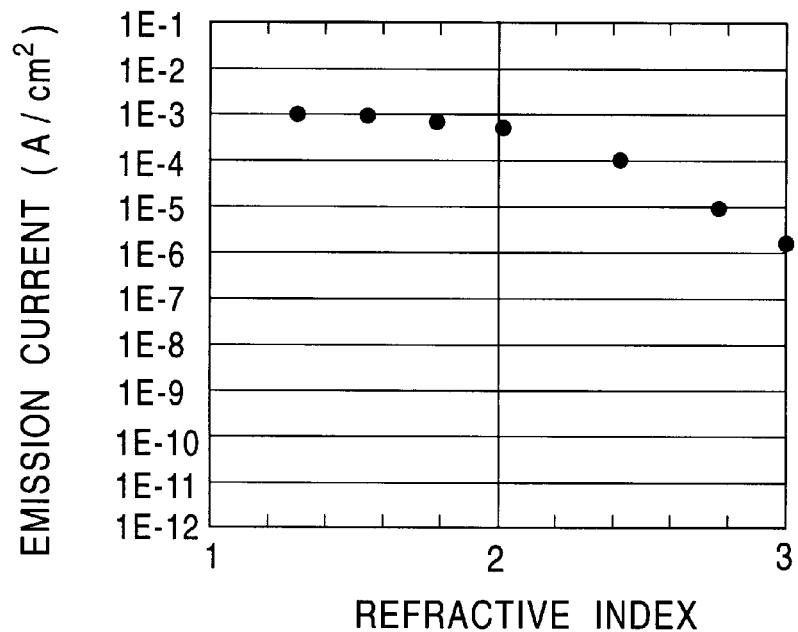
FIG. 18 is a graph illustrating a dependency of the electron emission current on the refractive index of an $SiO_x$ layer in the electron emission device embodying the invention.
Figure 19:
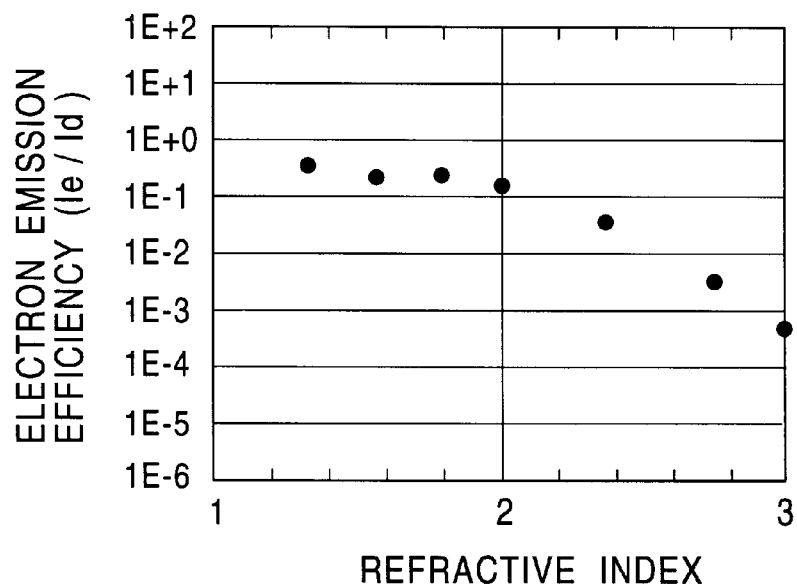
FIG. 19 is a graph showing a dependency of the electron emission efficiency on the refractive index of the $SiO_x$ layer in the electron emission device embodying the invention.

FIGS. 18 and 19 show the relationships between the refractive index of SiO$_2$ layer and both the maximum emission current Ie and the maximum electron emission efficiency (Ie/Id) respectively. As seen from these Figures, it is understood that the emission current of $1\times10^{-6}$ A/cm$^2$ or greater and the electron emission efficiency of $1\times10^{-3}$ or greater can be acquired from an electron emission device which has an insulator layer of SiO$_2$ having an refractive index of 1.3 to 3.0. It is under stood that the insulator layer is made of silicon oxide as a major component of SiO$_x$ where x represents an atomic ratio satisfying a refractive index in a range of from 1.3 to 3.0.

<Dielectric Constant of Insulator Layer>

The junction interface between metal and semiconductor in the electron emission device is similar to the Schottky diode. We take a notice of dielectric constant and consider the potential barrier between the electron supply layer 12 and the insulator layer 13 in the MIM structure of the device comprising the electron supply layer 12, the insulator layer 13 and the thin-film metal electrode 15.

Figure 20:
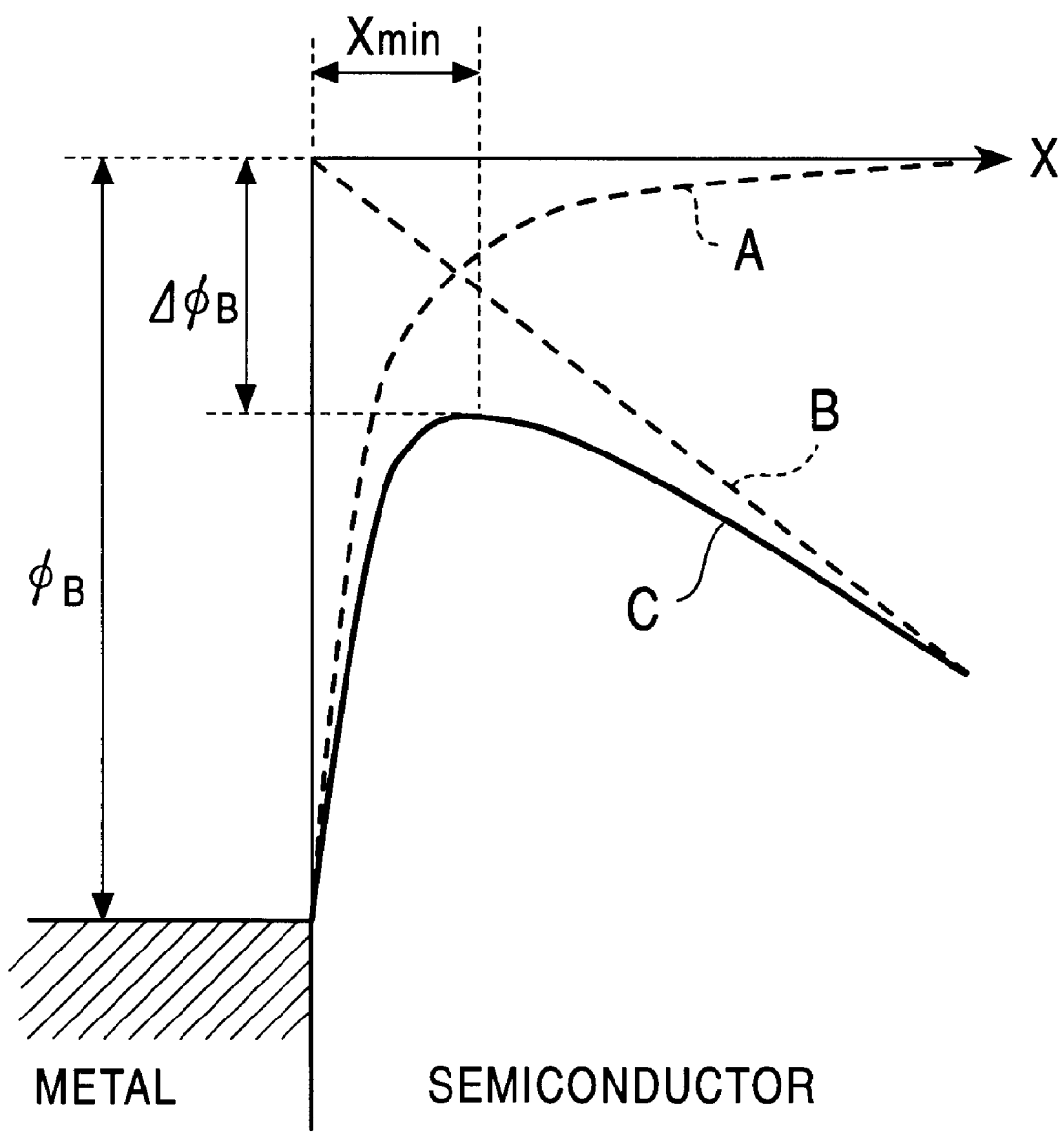
FIG. 20 is an energy band diagram illustrating an interface between a metal and a semiconductor of an electron emission device according to the present invention which show a lowered Schottky barrier caused by the combined effects of the image force and the electric field applied to the interface.

As shown in FIG. 20 there is a potential barrier in the interface of metal/insulator (semiconductor) in which carriers travel so as to match the Fermi level at an initial state.

The Schottky barrier $\Phi$B has a height from the Fermi level to the conduction band of the insulator (semiconductor) in the junction interface. When an electron (charged Q) travels from metal of the electron supply layer to the insulator layer through the interface of metal/insulator, the potential energy of an electron at a distance X from the metal surface is an image potential energy A plotted in broken line shown in FIG. 20. When an external electric field B plotted in broken line shown in the Figure is applied, the sum of the image potential energy and the external electric field is equal to the total potential energy. The Schottky barrier lowering $\Delta\Phi$B therefore occurs from Schottky barrier $\Phi$B at the location $X_{min}$ as shown in curve C in FIG. 20. When the high electric field is applied to the interface of metal/insulator, the work function lowering $\Delta\Phi$B is estimated by the following formula.

$$\Delta\Phi B = (qE/4\pi\epsilon_0\epsilon_s)^{1/2}$$

where E denotes an intensity of an applied electric field, q denotes a charge quantity, $\epsilon_s$ denotes a dielectric constant of the insulator , and $\epsilon_0$ denotes the dielectric constant of vacuum space.

In other words, it is understood that, as the higher applied electric field is and the lower dielectric constant of the insulator is, the height of barrier becomes lower (i.e., $\Delta\Phi$B becomes larger) so as to facilitate the injection (tunneling) of electrons from metal to semiconductor. Therefore, the selection of the insulator material having a low dielectric constant is effective to lower the height of barrier. The following Table 1 shows various materials, their dielectric constants $\epsilon_s$ and their electric resistance values respectively.

TABLE 1

|  | Dielectric constant | Electric resistance ($\Omega$cm) |
| --- | --- | --- |
| Si | 11.9 | $2.3 \times 10^5$ |
| SiO | 6 |  |
| SiO$_2$ (crystal) | 5.8 | $>10^{14}$ |
| SiO$_2$ (amorphous) | 3.9 | $10^4 \sim 10^{16}$ |
| Al$_2$O$_3$ (normal) | 9.2 | $>10^{14}$ |
| Al$_2$O$_3$ (high purity alumina) | 8.6~10.55 |  |
| BeO | 6.4 | $>10^{14}$ |
| ZnS | 5.2 |  |
| ZnO | 9.0 |  |
| CaF$_2$ | 6.76 |  |
| Si$_3$N$_4$ (amorphous) | 7.5 | $\sim 10^{14}$ |
| SiC | 10.0 |  |
| Ta$_2$O$_3$ | 8 |  |
| ZrO$_2$ | 28 |  |
| TiO$_2$ | 40 |  |
| Steatite (MgO—SiO$_2$) | 5.9 |  |

Electron emission devices according to the invention were fabricated by using SiO$_2$, SiO, Al$_2$O$_3$, SiC, Ta$_2$O$_3$ for the insulator and their characteristics were examined specifically.

Amorphous SiO$_x$, fusion silica (from Corning incorporated 7940: $\epsilon_s$=3.78), and Pyrex™ (from Corning incorporated 7740: $\epsilon_s$=4.6) were used as SiO$_x$. The fusion silica has the same dielectric constant as quartz.

An electron supply layer 12 of silicon (Si) was formed at 5000 nm thick, by sputtering, on an electrode surface of a device substrate 10 of glass on which an ohmic electrode 11 of tungsten (W) was previously formed 300 nm thick by sputtering. Various substrates with the Si supply layer of this type were prepared.

Then, various insulator layers 13 above mentioned were formed on the Si electron supply layers 12 of the substrates by sputtering while changing the film thickness of the insulator layer in a range from 50 nm to 1000 nm. Thus different substrates with the insulator layer were provided.

Each insulator layer was formed by sputtering by using a gas of Ar, Kr or Xe or a mixture thereof, or a gas mixture essentially consisting of one of those rare gases with $O_2$, $N_2$ or the like mixed therein, under the sputtering conditions of a gas pressure of 0.1 to 100 mTorr, preferably 0.1 to 20 mTorr and the forming rate i.e., deposition rate of 0.1 to 1000 nm/min, preferably 0.5 to 100 nm/min. The single layer or multilayer structure, the amorphous or crystal phase, the grain size and the atomic ratio of each insulator layer 13 was able to be controlled by properly altering the sputtering target and sputtering conditions of the sputtering device.

The analysis on an $SiO_2$ insulator layer 13 in this embodiment by X-ray diffraction was performed and then the result showed some halo intensity Ia caused by the amorphous phase. It can be assumed from this result that $SiO_2$ of the insulator layer consists of an amorphous phase portion.

Finally, a thin-film metal electrode 15 of Pt was formed at a 10 nm thick on the surface of the insulator layer 13 of each substrate by sputtering, thus providing plural device substrates.

Then, transparent substrates 1 were prepared, each of which has an ITO collector electrode 2 formed on the inside thereof. Fluorescent layers 3 of fluorescent substances corresponding to R, G and B color emissions were formed on the separate collector electrodes by the normal scheme.

Electron emission devices were assembled in such a manner that each pair of the device substrate and the transparent substrate are supported apart from one another by 10 mm in parallel by a spacer so that the thin-film metal electrode faces the collector electrode, with the clearance therebetween made to vacuum of $10^{-7}$ Torr or $10^{-5}$ Pa.

Figure 21:
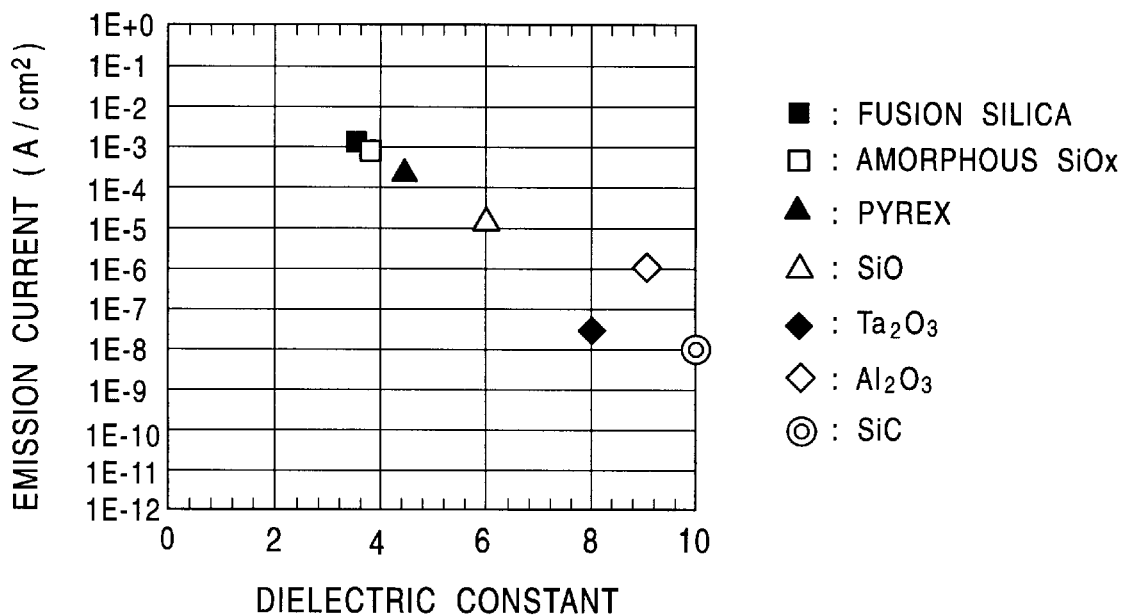
FIG. 21 is a graph showing a relationship between a dielectric constant of insulator layer and the emission current in an electron emission device according to the invention.
Figure 22:
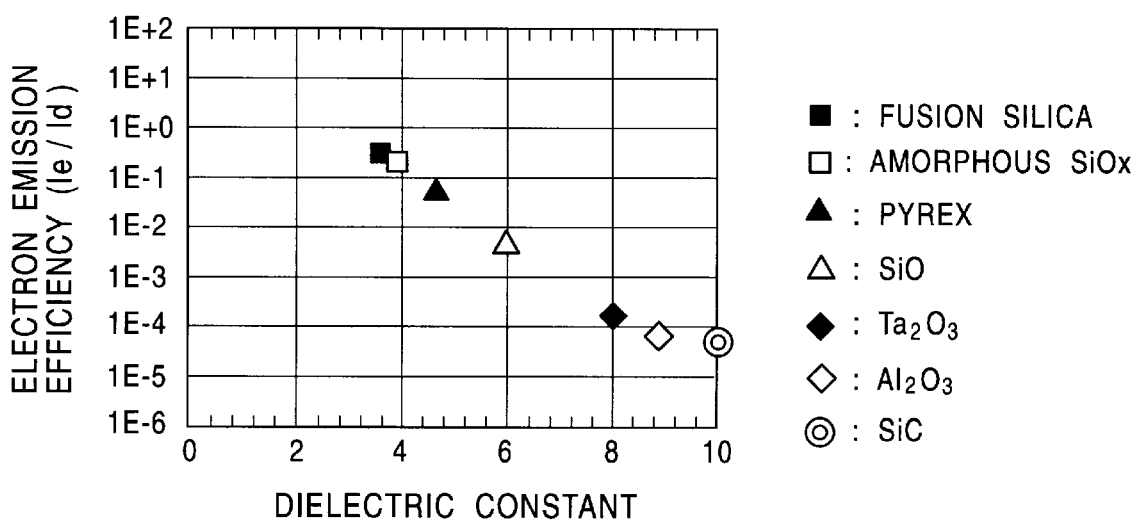
FIG. 22 is a graph showing a relationship between a dielectric constant of insulator layer and the electron emission efficiency in the electron emission device according to the invention.

Then, the diode current Id and the emission current Ie of each of the acquired plural devices with 400 nm thickness insulator layer were measured with respect to the dielectric constant of materials while a driving voltage Vd of 0 to 200 V was applied to the prepared electron emission devices. FIG. 21 shows a relationship between a dielectric constant of the insulator layer and the emission current in the electron emission device. FIG. 22 shows a relationship between a dielectric constant of insulator layer and the electron emission efficiency in the electron emission device. In these Figures, the plots of ■ denote the emission current Ie and the electron emission efficiency (Ie/Id) of the device having the insulator layer of fusion silica, □ denote amorphous $SiO_x$, ▲ denote Pyrex, Δ denote SiO, ♦ denote $Ta_2O_3$, ◊ denote $Al_2O_3$, and ◉ denote SiC respectively. As apparent from the results, there a tendency that the emission current Ie and the electron emission efficiency (Ie/Id) decrease as the dielectric constant increases. It is understood that devices using the material having a dielectric constant of 8 or less e.g., fusion silica, $Ta_2O_3$, amorphous $SiO_x$, Pyrex, SiO have an electron emission efficiency of $1 \times 10^{-4}$ or more.

Figure 23:
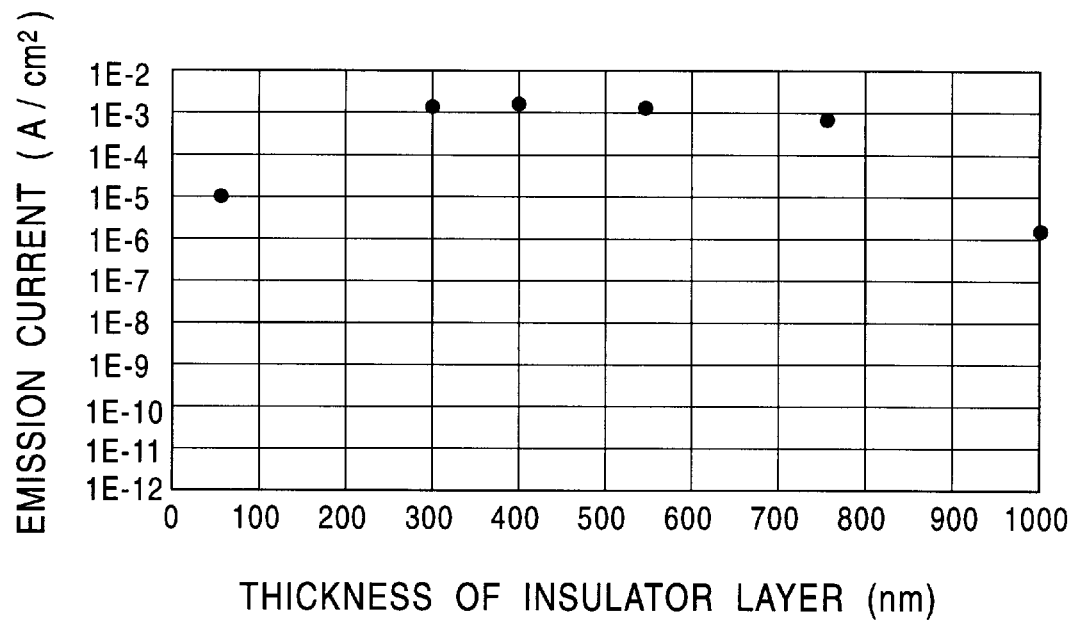
FIG. 23 is a graph illustrating a dependency of the electron emission current on the film thickness of an insulator layer in the electron emission device embodying the invention.
Figure 24:
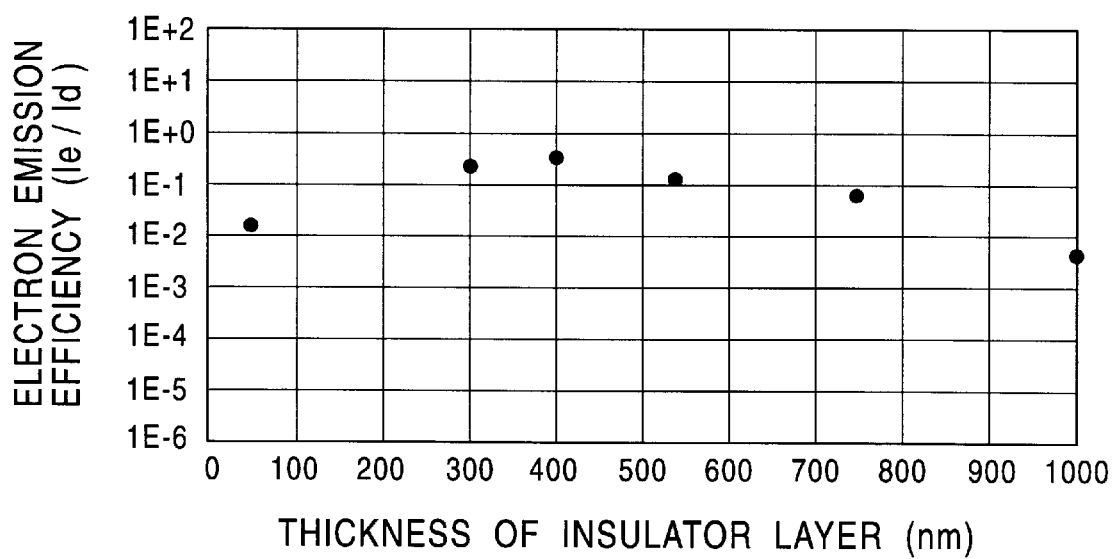
FIG. 24 is a graph showing a dependency of the electron emission efficiency on the film thickness of the insulator layer in the electron emission device embodying the invention.

The maximum emission current Ie and the maximum electron emission efficiency (Ie/Id) were further measured with respect to the film thickness of the amorphous $SiO_x$ layer while a driving voltage Vd of 0 to 200 V was applied to the prepared electron emission devices. FIG. 23 shows a relationship between a film thickness of insulator layer and the emission current Ie in the electron emission device. FIG. 24 shows a relationship between a film thickness of insulator layer and the electron emission efficiency (Ie/Id) in the electron emission device. As apparent from these Figures, the device whose amorphous $SiO_x$ layer had a thickness of 50 to 1000 nm showed the maximum emission current of about $1 \times 10^{-6}$ A/cm$^2$ or more and the maximum electron emission efficiency of about $1 \times 10^{-1}$ under the application of 200 V.

To obtain a good electron emission efficiency, it is understood that the insulator layer is made of a dielectric substance with a dielectric constant of 8 or less and has a film thickness of 50 nm or greater preferably 100 nm or greater in the electron emission device.

With a voltage of approximately 4 kV applied between the fluorescent-substance coated collector electrode and the thin-film metal electrode, a uniform fluorescent pattern corresponding to the shape of the thin-film metal electrode was observed in the device whose amorphous $SiO_x$ layers have a thickness of 50 nm or greater. This shows that the electron emission from the amorphous $SiO_x$ layer is uniform and has a high linearity. Therefore, those devices can serve as an electron emission diode or a light-emitting diode i.e., laser diode which emits electromagnetic waves of milliwave or submilli-wave and furthermore as a high speed switching device.

As mentioned above, the use of a relatively low dielectric constant for the insulator layer is effective in the electron emission to achieve a high electron emission efficiency. Such dielectric materials includes $SiO_2$, $SiO_x$(X=1 to 2), an alloy of $SiO_2$ and MgO, ZnS, $CaF_2$, $SrF_2$, SiN and the like.

The change with respect to temperature of dielectric constant $\epsilon_s$ of fusion silica (from Corning incorporated 7940) used in the above embodiment is measured after the thermal heating process. Table 2 shows as follows:

TABLE 2

| Temperature of thermal process | Dielectric constant |
|---|---|
| 30° C. | 3.7 |
| 300° C. | 3.8 |
| 500° C. | 3.85 |
| 800° C. | 3.9 |
| 1000° C. | 3.95 |
| 1200° C. | 3.98 |

As seen from Table 2, the change of the dielectric constant of fusion silica $SiO_x$ is very small in a range 30° C. to 1200° C. and has a thermal stableness.

The oxides of $Ta_2O_3$, $ZrO_2$, $TiO_2$ were easily destructive and difficult in occurrence of negative resistance, and had a high conductivity in comparison with oxides of Si, AlON, so that the use of such former oxides is difficult for the electron emission device.

<Light Emission at the Side of Device Substrate>

Each of the forgoing examples of the electron emission devices on the first device substrate 10 is an opaque lamination comprising the electron supply layer 12, the insulator layer 13 and the thin-film metal electrode 15. The second transparent substrate 1 carries the transparent collector electrode 2 and the fluorescent layer(s) 3 . The observer looks at emission light through the second transparent substrate by ordinary. Such a construction of the electron emission device provides only light passing through the transparent collector electrode 2 and the fluorescent layer(s) 3.

Figure 25:
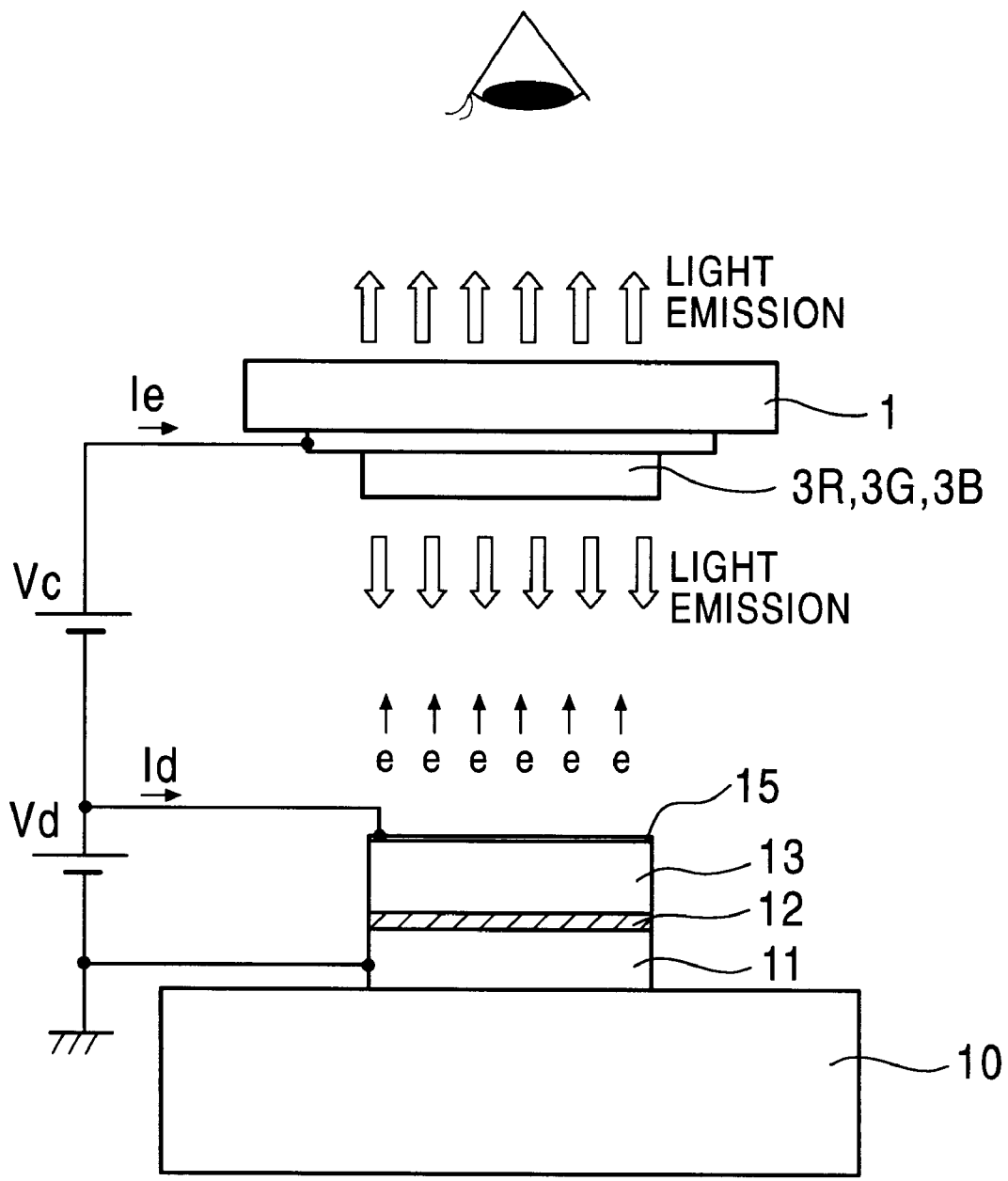
FIG. 25 is a schematic cross-sectional view of an electron emission device of another embodiment according to the invention which emits light toward both sides.

Thus, this example provides an electron emission device capable of emitting light through the first device substrate 10 of transparent glass on which, as shown in FIG. 25, the electron supply layer 12 is deposited at a thickness of 100 nm or less so as to be transparent due to a very thin-film formation. Furthermore, a light-permeable ohmic electrode 11 is also formed of indium tin oxide (so-called ITO), ZnO, $In_2O_3$, SrO or the like between the electron supply layer 12 and the first device substrate 10. In addition to the insulator layer 13 having a thickness of 50 nm preferably 100 to 400 nm thick, the lamination of the ohmic electrode 11, the insulator layer 13 and the thin-film metal electrode 15 is very thin as a whole. Therefore, the emitted light form the fluorescent layer(s) 3 fully passes through such a lamination on the first device substrate 10 of glass.

<Electron Emission Device with an Alloy Intermediate Layer>

Figure 26:
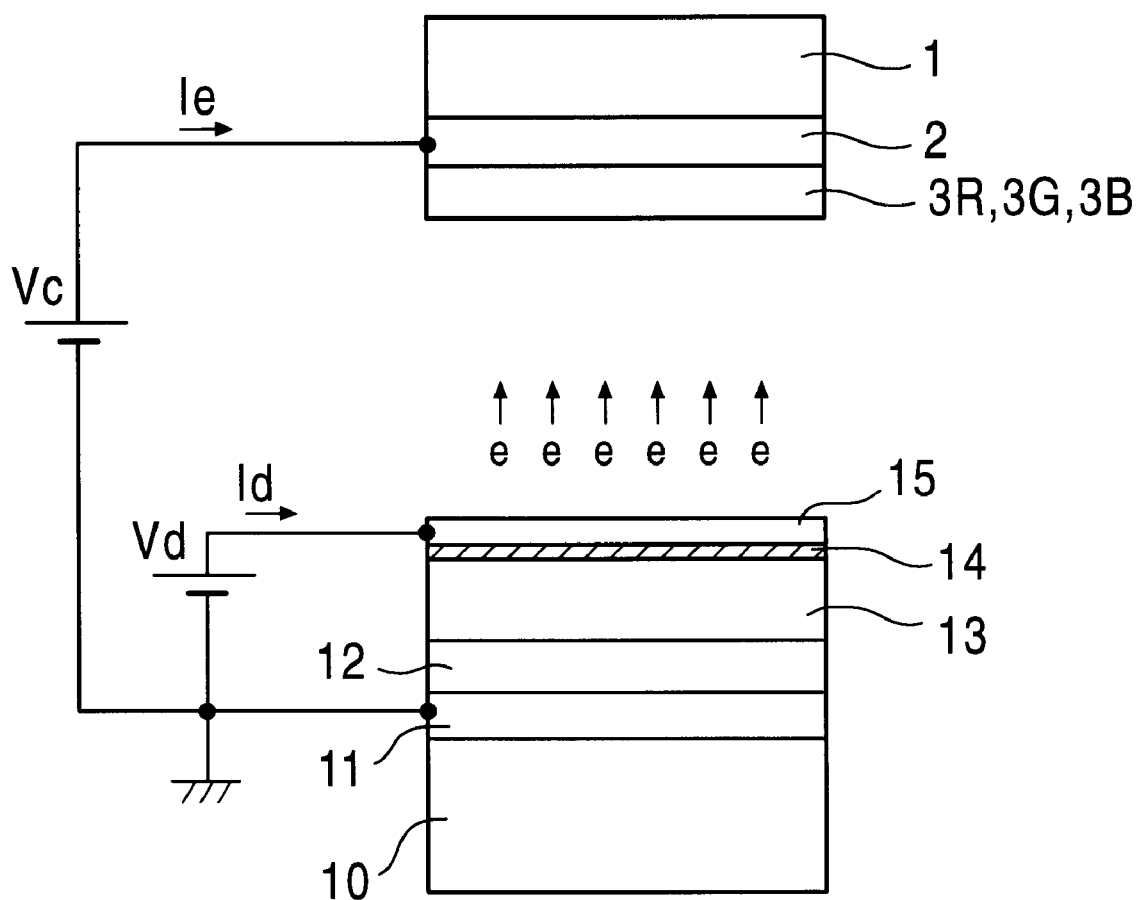
FIG. 26 is a schematic cross-sectional view showing an electron emission device of a further embodiment according to the invention which has an intermediate layer disposed between the thin-film metal electrode and the insulator layer.

As shown in FIG. 26, an electron emission device of this embodiment has an electron supply layer 12 of metal or semiconductor such as Si or the like, an insulator layer 13 of $SiO_x$ such as $SiO_2$ or the like, an intermediate layer 14 of an Al—Li alloy and a thin-film metal electrode 15 of metal such as Au facing a vacuum space which are layered or formed in turn on an ohmic electrode 11 of Al previously formed on a device substrate 10. A pair of the device substrate 10 of a first substrate and a the transparent substrate 1 are supported so as to face each other sandwiching a vacuum space therebetween. A transparent collector electrode 2 and a fluorescent layer 3R, 3G or 3B of fluorescent substance are formed in turn on the internal surface of the transparent substrate 1.

The material used for the thin-film metal electrode 15 is selected from substances each having a high electric resistance such as Au, Ag, Al, Cu which have a high work function of 4 (eV) or more. The material used for the intermediate layer 14 is selected from substances each having a work function equal to or lower than that of the thin-film metal electrode 15.

For example, a conductive material such as a metal of Ag, Al, Au, Ba, C, Ca, Cd, Cu, Fe, K, Li, Mg, Mo, Na, Nb, Ni, Pb, Pt, Sb, Si, Sn, Sr, Ta, Ti, Th, W, Zr, or Zn, or an alloy of Al—Li, In—Li, Mg—Sr, Al—Sr or Th—W, or an oxide of BaO, SrO or $ThO_2$, or a complex oxide such as $BaSrO_2$, or a boride such as $LaB_6$, $CaB_6$ or $SrB_6$, or a carbide such as ZrC, or ITO ($InO_2$—$SnO_2$) can be used as the intermediate layer 14 disposed between the insulator layer 13 and the thin-film metal electrode 15. It should be noted that the material used for the intermediate layer 14 is selected from substances each having a work function equal to or lower than that of the thin-film metal electrode 15.

Electron emission devices according to the invention were fabricated and their characteristics were examined concretely.

An electron supply layer 12 of silicon (Si) was formed at 5000 nm thick, by sputtering, on an electrode surface of a device substrate 10 of glass on which an ohmic electrode of Al was previously formed 300 nm thick by sputtering. A plurality of Si substrates of this type were prepared.

Then, insulator layers 13 of $SiO_2$ were formed on the electron supply layers 12 of the Si substrate by sputtering respectively while changing the film thickness of the insulator layer in a range from 0 nm to 500 nm. Thus a plurality of $SiO_2$-insulator substrates were provided. The $SiO_2$ insulator layer was formed by sputtering by using a gas of Ar, Kr or Xe or a mixture thereof, or a gas mixture essentially consisting of one of those rare gases with $O_2$, $N_2$ or the like mixed therein, under the sputtering conditions of a gas pressure of 0.1 to 100 mTorr, preferably 0.1 to 20 mTorr and the forming rate of 0.1 to 1000 nm/min, preferably 0.5 to 100 nm/min. To obtain the single layer or multilayer structure, the amorphous or crystal phase, the grain size and the atomic ratio of the goal insulator layer 13, the sputtering device was controlled by properly altering the sputtering target and sputtering conditions.

The analysis on each $SiO_2$ insulator layer in this embodiment by X-ray diffraction was performed and then the result showed a minor diffraction intensity Ic caused by the crystal portion and a major halo intensity Ia caused by the amorphous phase. It can be assumed from this result that $SiO_2$ of the insulator layer mainly comprises of an amorphous phase portion.

Finally, an intermediate layer of an Al—Li alloy was formed at a thickness range of 10 to 100 nm on the surface of each amorphous $SiO_2$ layer and then a thin-film metal electrode of Pt was formed at a 10 nm thick on the surface of the intermediate layer of each substrate by sputtering, thus providing plural device substrates with various thickness intermediate layers.

Meanwhile, transparent substrates 1 were prepared, each of which has ITO collector electrodes 2 formed inside thereof. Fluorescent layers 3 of fluorescent substances corresponding to Red, Green and Blue color emissions were formed on the collector electrodes 2 by the normal scheme respectively.

Electron emission devices were assembled by holding those device substrates and transparent substrates apart from one another by 10 mm in parallel by a spacer in such a way that the thin-film metal electrode faced the collector electrode, with the clearance therebetween made to vacuum of $10^{-7}$ Torr or $10^{-5}$ Pa.

Then, there were measured the diode current Id and the emission current Ie corresponding to the thickness of the $SiO_2$ film of each of the acquired plural devices.

As a result, by applying a voltage of 200 V or lower, the emission current of $1\times10^{-6}$ $A/cm^2$ or greater and the electron emission efficiency of $1\times10^{-3}$ or greater were obtained from the electron emission device which has an $SiO_2$ dielectric layer with 50 nm in thickness. Furthermore, the emission current of $1\times10^{-3}$ $A/cm^2$ or greater and the electron emission efficiency of $1\times10^{-1}$ or greater were obtained from the electron emission device which has an $SiO_2$ dielectric layer with 300 nm in thickness. Therefore, it was understood that the good emission current and electron emission efficiency were obtained in the devices each having an $SiO_2$ dielectric layer with 50 nm or greater, preferably 100 nm or greater in thickness.

With a voltage of approximately 4 kV applied between the fluorescent-substance coated collector electrode 2 and the thin-film metal electrode 15, a uniform fluorescent pattern corresponding to the shape of the thin-film metal electrode was observed in the devices whose $SiO_2$ layers have thicknesses of 50 nm or greater. This shows that the electron emission from the amorphous $SiO_2$ layer is uniform and has a high linearity, and that those devices can serve as an electron emission diode, or a light-emitting diode or laser diode which emits electromagnetic waves of infrared rays, visible light or ultraviolet rays.

According to the electron emission device of this embodiment according to the invention with the intermediate layer of a low work function, the insulator layer has a large thickness so that any holes are not likely to be produced, whereby the production yield is improved. The emission current of the electron emission device is greater than $1\times10^{-6}$ $A/cm^2$ and is approximately $1\times10^{-3}$ $A/cm^2$, and the electron emission efficiency obtained is $1\times10^{-1}$. Therefore, this electron emission device, when in use in a display device, can provide a high luminance, can suppress the consumption of the drive current and the generation of heat from the device, and can reduce a burden on the driving circuit.

<Electron Emission Device Including a Region Containing Atoms or Compounds of a Low Work Function>

Inventors directed their attention to the relevant points to a region containing atoms or compounds of a low work function used for the intermediate layer in the above embodiments. Inventors fabricated various electron emission devices while altering the conditions of the region containing atoms or compounds of a low work function to improve the performance and stableness of the electron emission devices and then examined concretely their characteristics thereof. As a result, Inventors revealed that there are effective matters that one of the thin-film metal electrode and the insulator layer is provided with a region containing atomic elements each having a work function such as the group I i.e., alkaline metals, the group II i.e., alkaline-earth metals, lanthanoids i.e., rare-earth elements or compounds combined thereto in order to improve the performance and stableness of the electron emission device comprising an electron supply layer, an insulator layer and a thin-film metal electrode. This feature includes the above mentioned embodiment in which the intermediate layer of a low work function is disposed between the thin-film metal electrode and the insulator layer.

The atomic elements belonging to the group I, the group II and lanthanoids are preferably used for the region above mentioned because of their low work function in comparison with the other atomic elements. For example, their atomic symbols and their work functions (WORK FUNCTION) will be listed as follows: in the group I, Li(2.39), Na(2.27), K(2.15), Rb(2.13), Cs(1.89); in the group II, Be(3.37), Mg(3.46), Ca(2.76), Sr(2.35), Ba(2.29); in the lanthanoids, La(3.5), Ce(2.7), Pr(2.7), Nd(3.1), Pm, Sm(2.7), Eu(2.5), Gd(2.7), Tb(2.6), Dy(2.2), Ho(2.3), Er(2.4), Tm, Yb, Lu(3.3).

The single elements above listed or compounds combined thereto may be used as a low work function substances. Such elements and compounds are as follows: with respect to the group I a, $LiO_2$, LiI, $Li_2SiO_3$, $Li_2TiO_3$, $Na_2O$, NaI, $NaFeO_2$, $Na_4SiO_4$, $K_2O$, KI, $K_2TiO_3$, $K_2WO_4$, $Rb_2O$, RbBr, $Rb_2CrO_4$, $Cs_2O$, CsBr, $CsCrO_4$; with respect to the group IIa, BeO, $BeY_2O_4$, $BeNb_2O_4$, $BeIn_2O_4$, $BeTa_2O_6$, MgO, $Mg_2Ag$, $MgY_2O_4$, $MgNb_2O_4$, $MgIn_2O_4$, $MgTa_2O_6$, CaO, $Ca_2Cu$, $CaY_2O_4$, $CaNb_2O_4$, $CaIn_2O_6$, $CaTa_2O_6$ SrO, SrS, $SrY_2O_4$, $SrNb_2O_6$, $SrIn_2O_4$, $SrTa_2O_6$, BaO, $BaTiO_3$, $BaY_2O_4$, $BaNb_2O_4$, $BaIn_2O_6$, $BaTa_2O_6$; and with respect to the lanthanoids, $La_2O_3$, $BeLa_2O_4$, $MgLa_2O_4$, $CaLa_2O_4$, $SrLa_2O_4$, $BaLa_2O_4$, $Ce_2O_3$, $BeCe_2O_4$, $MgCe_2O_4$, $CaCe_2O_4$, $SrCe_2O_4$, $BaCe_2O_4$, $Pr_2O_3$, $BePr_2O_4$, $MgPr_2O_4$, $CaPr_2O_4$, $SrPr_2O_4$, $BaPr_2O_4$, $Nd_2O_3$, $BeNd_2O_4$, $MgNd_2O_4$, $CaNd_2O_4$, $SrNd_2O_4$, $BaNd_2O_4$, $Sm_2O_3$, $BeSM_2O_4$, $MgSm_2O_4$, $CaSm_2O_4$, $SrSM_2O_4$, $BaSm_2O_4$, $Eu_2O_3$, $BeEu_2O_4$, $MgEu_2O_4$, $CaEu_2O_4$, $SrEu_2O_4$, $BaEu_2O_4$, $Gd_2O_3$, $BeGd_2O_4$, $MgGd_2O_4$ $CaGd_2O_4$, $SrGd_2O_4$, $BaGd_2O_4$, $Tb_2O_3$, $BeTb_2O_4$, $MgTb_2O_4$, $CaTb_2O_4$, $SrTb_2O_4$, $BaTb_2O_4$, $Dy_2O_3$, $BeDy_2O_4$, $MgDy_2O_4$, $CaDy_2O_4$, $SrDy_2O_4$, $BaDy_2O_4$, $Ho_2O_3$, $BeHo_2O_4$, $MgHo_2O_4$, $CaHo_2O_4$, $SrHo_2O_4$, $BaHo_2O_4$, $Er_2O_3$, $BeEr_2O_4$, $MgEr_2O_4$, $CaEr_2O_4$, $SrEr_2O_4$, $BaEr_2O_4$, $Tm_2O_3$, $BeTm_2O_4$, $MgTm_2O_4$, $CaTm_2O_4$, $SrTm_2O_4$, $BaTm_2O_4$, $Yb_2O_3$, $BeYb_2O_4$, $MgYb_2O_4$, $CaYb_2O_4$, $SrYb_2O_4$, $BaYb_2O_4$, $Lu_2O_3$, $BeLu_2O_4$, $MgLu_2O_4$, $CaLu_2O_4$, $SrLu_2O_4$, $BaLu_2O_4$. The compounds used as a low work function substances in the invention include oxides, nitrides, complexes oxides, alloys, salts and inorganic compounds. The work function of the compound is dependent on the included atom having a lowest work function. Furthermore, the substance mentioned above in the embodiments is included in the low work function substances.

<Another Embodiment Including a Region Containing Atoms or Compounds of a Low Work Function>

A region containing the other atoms or compounds of a low work function than the above may be formed between the insulator layer 13 and the thin-film metal electrode 15. In this case, the intermediate layer is an alloy of the group I, the group II, or the mixture thereof. The intermediate layer may be enhanced as a compound to be in an island-shape capable of lamination to facilitate the transferring of electrons from the insulator to the thin-film metal electrode.

The intermediate layer was formed by sputtering by using a gas of Ar, Kr or Xe or a mixture thereof under the sputtering conditions of a gas pressure of 1 to 20 mTorr, preferably 0.4 to 40 mTorr and the forming rate of 0.1 to 10 nm/sec. for a pertinent time period. After the film-forming, there are a shape of many islands dispersed instead of a layer-shape but such an island-shape is effective for the intermediate layer.

Concretely, an electron emission devices was manufactured through the same manner as the above embodiments with the intermediate layer except that the low work function substance of $Tb_4O_7$ is used for each intermediate layer while controlling the sputter conditions of the gas pressure of 5 mTorr or the forming rate i.e., deposition rate 0.5 nm/sec for a forming time period of 2 seconds. Then, there were measured the diode current Id and the emission current Ie corresponding to the film thickness of the $SiO_2$ insulator layer.

Figure 27:
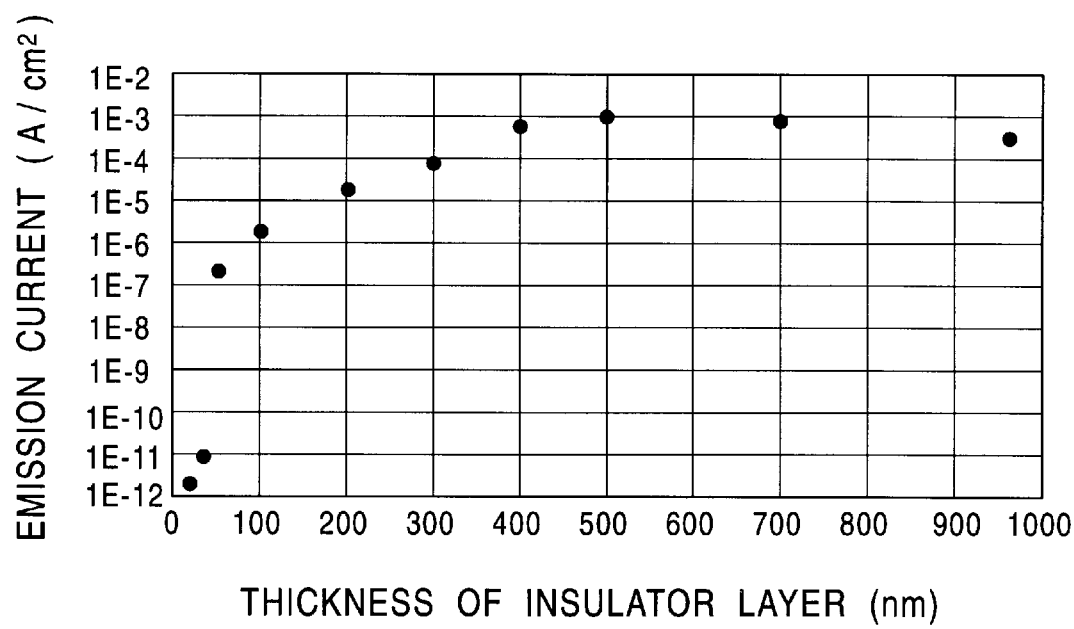
FIG. 27 is a graph illustrating a dependency of the electron emission current on the film thickness of an $SiO_2$ layer in the electron emission device in another embodiment of the invention.
Figure 28:
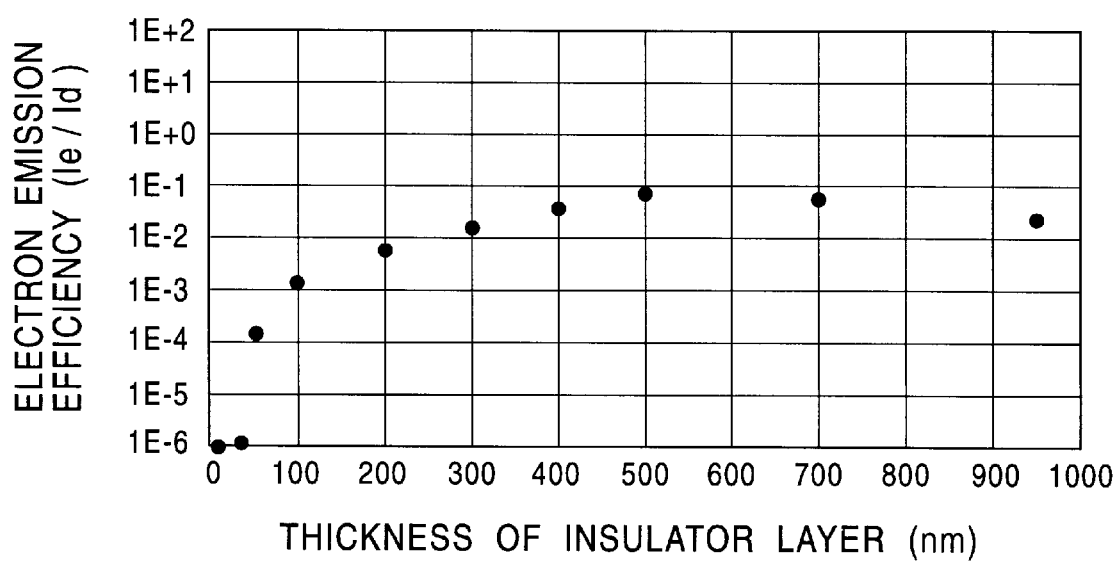
FIG. 28 is a graph showing a dependency of the electron emission efficiency on the film thickness of the $SiO_2$ layer in the electron emission device in another embodiment of the invention.

In the case that a driving voltage Vd of 0 to 100 V was applied to the prepared electron emission devices, FIG. 27 shows a relationship between a film thickness of insulator layer and the maxim emission current Ie in the electron emission device, and FIG. 28 shows a relationship between a film thickness of insulator layer and the maxim electron emission efficiency (Ie/Id) in the electron emission device. As apparent from these Figures, the device having the 50 nm or greater thick insulator layer shows an effective emission current Ie. The device whose insulator layer having a thickness of 400 to 700 nm showed the maximum emission current of about $1 \times 10^{-3}$ A/cm$^2$ and the maximum electron emission efficiency of about $1 \times 10^{-1}$.

Figure 29:
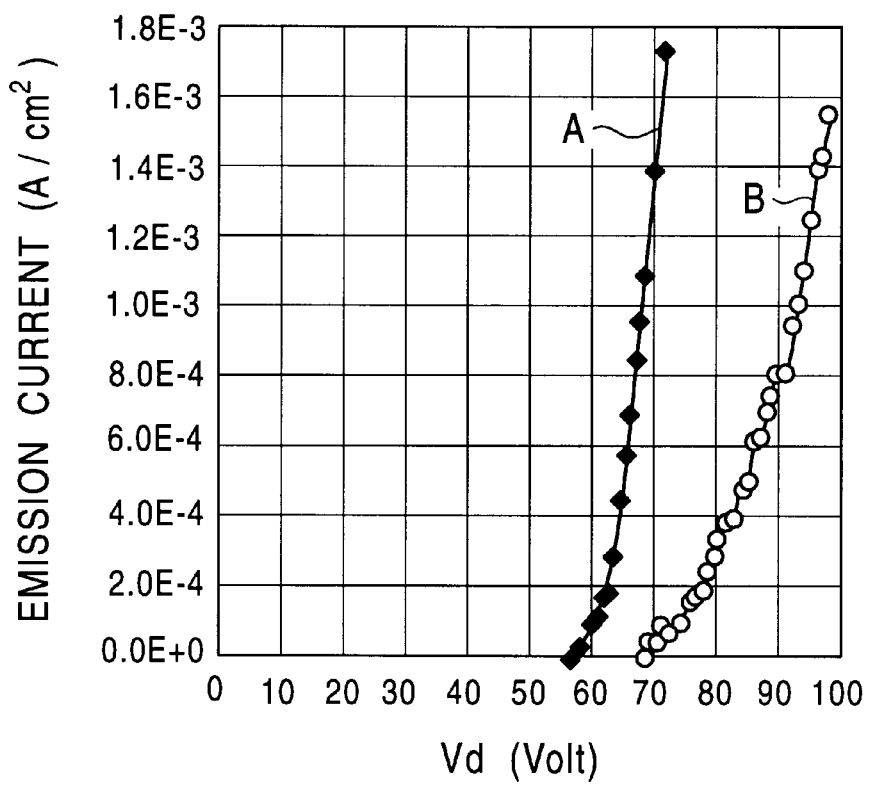
FIG. 29 is a graph illustrating a relationship between the emission current Ie and the driving voltage Vd applied for driving the electron emission device of an embodiment according to the invention.

FIG. 29 shows a property relationship between the emission current Ie and the driving voltage Vd of the electron emission devices both of the embodiment and the comparative electron emission when a driving voltage Vd of 0 to 100 V was applied to each prepared electron emission device. In Figure, the plots A denote a property of emission current of the device having the intermediate layer 14 and the plots B denote that of the comparative device assembled in the same manner except having non-intermediate layer. As seen from FIG. 29, the device having the intermediate layer began to emit electrons at a driving voltage Vd of about 55 V. In contrast, the device without any intermediate layer began to emit electrons at a driving voltage Vd of about 70 V or more. In this way, it is understood that the driving voltage of the electron emission device having the intermediate layer is reduced in comparison with the comparative.

<Electron Emission Device Including an Electron Emission Layer as a Region Containing Atoms or Compounds of a Low Work Function>

Figure 30:
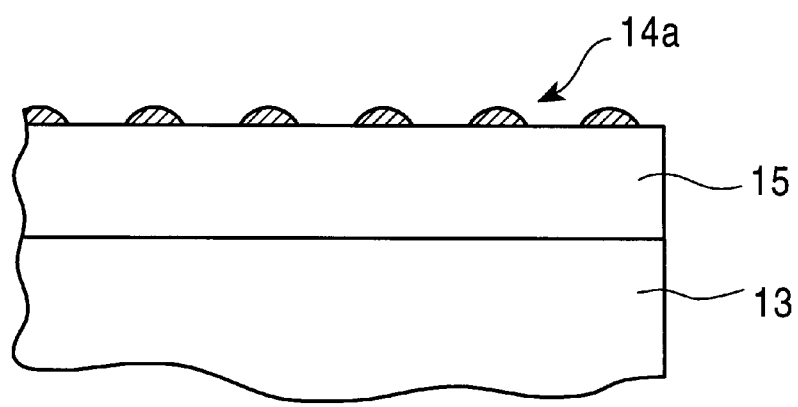
FIG. 30 is an partly enlarged schematic cross-sectional view showing an electron emission device of a still further embodiment according to the invention which has an electron emission layer disposed on an outer surface of the thin-film metal electrode.

FIG. 30 is an partly enlarged schematic cross-sectional view showing an electron emission device of another embodiment according to the invention which has an electron emission layer 14a disposed on an outer surface of the thin-film metal electrode 15. The electron emission device is manufactured through the same manner as the above embodiments except that the electron emission layer 14a is formed on the outer surface (facing a vacuum space) of the thin-film metal electrode 15, instead of the intermediate layer 14 of Al—Li alloy or $Tb_4O_7$ disposed between the insulator layer 13 and the thin-film metal electrode 15 in the above embodiment shown in FIG. 26. The electron emission layer 14a was formed at a thickness of 1 nm or less. In this case, the electron emission layer 14a was formed so as to be many island-shaped regions dispersed on the surface of the thin-film metal electrode 15 rather than a layer. The thin-film metal electrode 15 can lower the potential barrier.

In the above election emission device having the lamination structure of the electron emission layer 14a of a low work function, the thin-film metal electrode 15 and the insulator layer 13 are formed in turn. The material of the electron emission layer 14a may be preferably selected form the group I, the group II, lanthanides or a compound thereof. The thickness of the electron emission layer 14a may be set within 10 nm or less, otherwise the emission current decreases due to lost energy of electrons. This is because the electron emission layer is likely to scatter electrons passing therethrough when it has a thickness more than 10 nm.

The thin-film formation of the electron emission layer 14a may be performed through a sputtering method by using a sputter gas of Ar, Kr, Xe or the like under the sputtering conditions of a gas pressure of 1 to 20 mTorr and a forming rate of 0.1 to 10 nm/sec preferably while the thickness of the electron emission layer 14a is controlled by the thin-film formation time period. The analysis of the resultant electron emission layer 14a showed a film-growth in a multi-island shape as shown in FIG. 30 instead of a continuous layer. Nevertheless the multi-island shaped electron emission layer 14a has a sufficient effect to emit electrons. There are the other thin-film formation such as vacuum deposition, CVD, laser aberration, MBE and ion beam sputtering which are effective.

Concretely, an electron emission devices with a multi-island shaped electron emission layer 14a as shown in FIG. 30 was manufactured through the same manner as the above embodiments except that the electron emission layer of $Tb_4O_7$ was formed on the thin-film metal electrode 15. In this case, while controlling the sputter conditions of the gas pressure of 5 mTorr or the deposition rate 0.5 nm/sec, $Tb_4O_7$ was disposed for a forming time period of 2 seconds.

Then, there was measured the diode current Id and the emission current Ie corresponding to the film thickness of the $SiO_2$ insulator layer.

Figure 31:
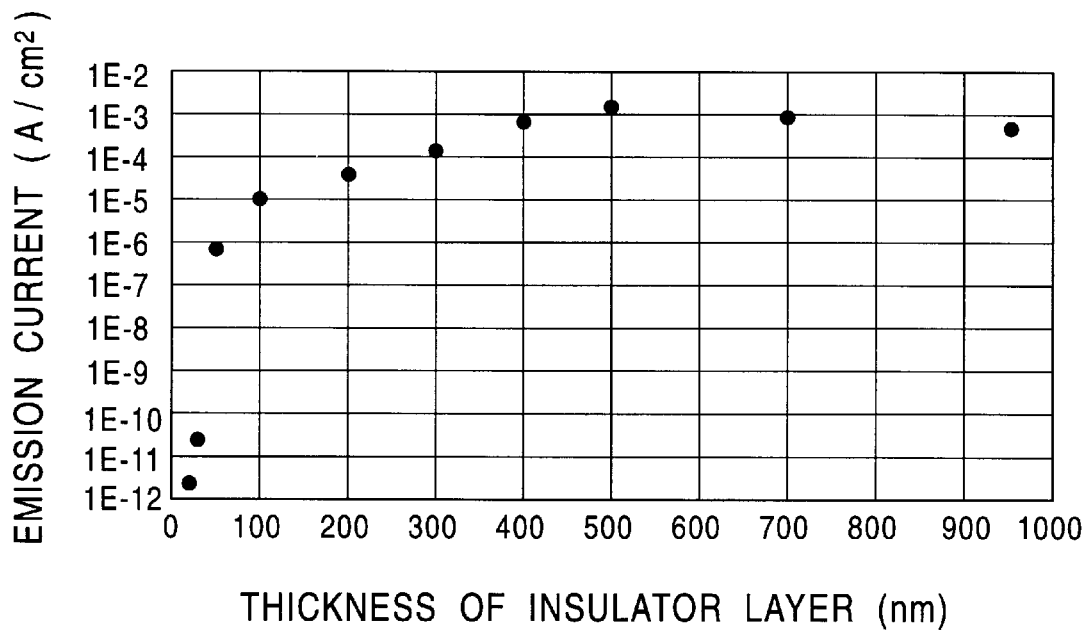
FIG. 31 is a graph illustrating a dependency of the electron emission current on the film thickness of an $SiO_2$ layer in the electron emission device shown in FIG. 30.
Figure 32:
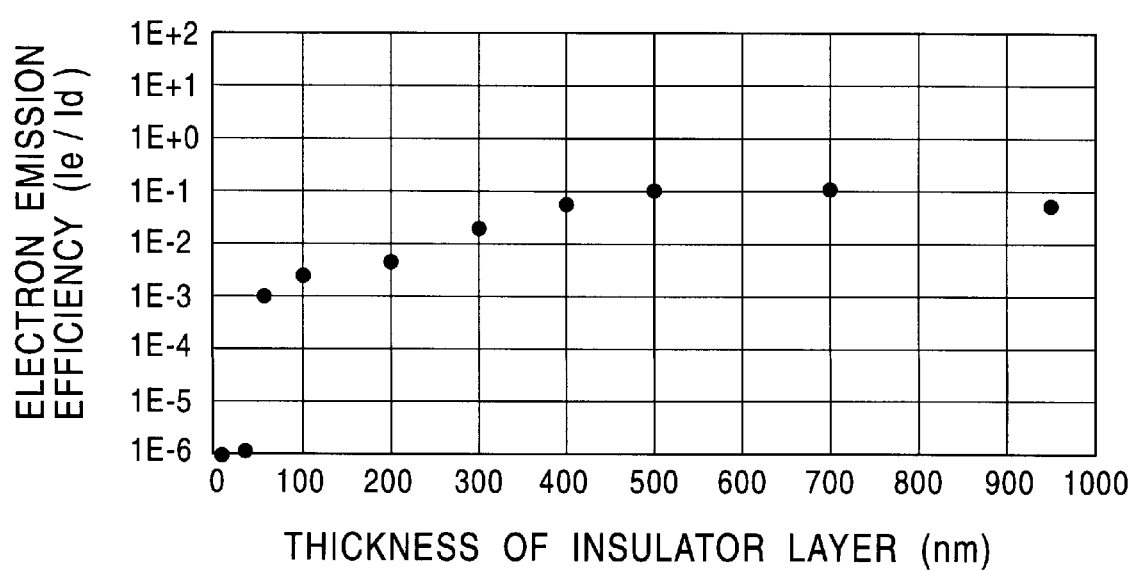
FIG. 32 is a graph showing a dependency of the electron emission efficiency on the film thickness of the $SiO_2$ layer in the electron emission device shown in FIG. 30.

In the case that a driving voltage Vd of 0 to 100 V was applied to the prepared electron emission devices, FIGS. 31 and 32 shows relationships between a film thickness of insulator layer and both the maxim emission current Ie and the maxim electron emission efficiency (Ie/Id) in the electron emission device. As apparent from these Figures, the device whose insulator layer having a thickness of 400 to 700 nm showed the maximum emission current of about $1 \times 10^{-3}$ $A/cm^2$ and the maximum electron emission efficiency of about $1 \times 10^{-1}$. To obtain a good electron emission efficiency, it is understood that the insulator layer has a film thickness of 50 nm or greater.

Figure 33:
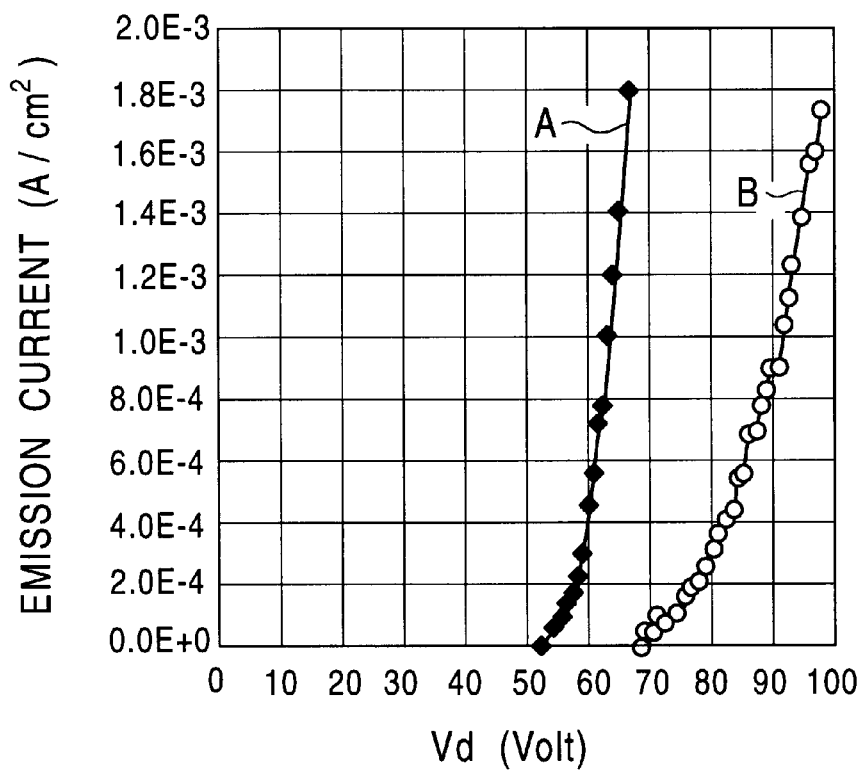
FIG. 33 is a graph illustrating a relationship between the emission current Ie and the driving voltage Vd applied for driving the electron emission device shown in FIG. 30.

FIG. 33 shows a property relationship between the emission current Ie and the driving voltage Vd of the electron emission devices both of the embodiment and the comparative electron emission when a driving voltage Vd of 0 to 100 V was applied to each prepared electron emission device. In Figure, the plots A denote a property of emission current of the device having the electron emission layer and the plots B denote that of the comparative device assembled in the same manner except that no electron emission layer is provided. As seen from FIG. 33, the device having the electron emission layer began to emit electrons at a driving voltage Vd of about 50 V. In contrast, the device without any electron emission layer began to emit electrons at a driving voltage Vd of about 70 V or more. In this way, it is understood that the driving voltage of the electron emission device having the electron emission layer is reduced in comparison with the comparative.

<Electron Emission Device Including a Region Containing Atoms or Compounds of a Low Work Function Which is Formed within the Thin-film Metal Electrode>

Figure 34:
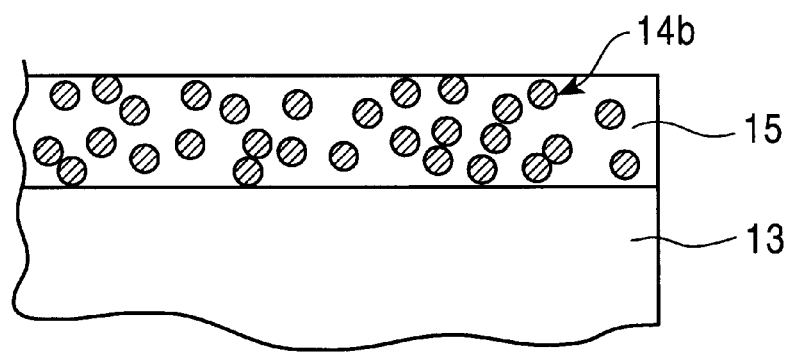
FIG. 34 is an partly enlarged schematic cross-sectional view showing an electron emission device of another embodiment according to the invention in which the thin-film metal electrode has a region containing atomic elements each having a work function which is lower than that of the thin-film metal electrode.

FIG. 34 is an partly enlarged schematic cross-sectional view showing an electron emission device of another embodiment according to the invention in which the thin-film metal electrode has a region 14b containing atomic elements each having a work function which is lower than that of the thin-film metal electrode 15. The electron emission device is manufactured through the same manner as the above embodiments except that the low work function regions 14b are disposed with in the thin-film metal electrode 15, instead of the intermediate layer 14 of Al—Li alloy or $Tb_4O_7$ disposed between the insulator layer 13 and the thin-film metal electrode 15 in the above embodiment shown in FIG. 26. In this case, the low work function regions 14b can lower the potential barrier and facilitate to transfer electrons from the insulator layer to the thin-film metal electrode.

In the electron emission device in which the low work function substances 14b are disposed in the thin-film metal electrode 15 formed on the insulator layer 13, the matrix of the thin-film metal electrode 15 serves as a thin-film applying a uniform electric field to a constant area of the surface of the device. It is therefore necessary for the matrix to employ a material having an electric resistance of $10^{-3}$ $\Omega cm$ or less. For example the matrix of the thin-film metal electrode 15 is selected from a substance having a $10^{-6}$ $\Omega cm$ order such as Al, Au, Pt, Cu, Pd, Ag, Ni, W, Ir, Fe, Co, and Ti. The low work function substances 14b are added to such a selected matrix to obtain the thin-film metal electrode 15. The mixture ratio of the low work function substances 14b added to the thin-film metal electrode 15 is dependent on the electric resistance of the matrix. The addition of the low work function substance to the matrix of the is controlled so that the thin-film metal electrode 15 has an electric resistance of $10^{-3}$ $\Omega cm$ or less.

The thin-film formation of the thin-film metal electrode 15 containing the low work function substances 14b may be performed through a sputtering method. In this case, a target of a pertinent mixture above mentioned may be used. A complex target of a major component target including an additive of a low work function substance may be also used. Alternatively, a co-sputtering method using two source targets may be employed in which a major component target and an additive target of a low work function substance are used.

Concretely, an electron emission devices having the thin-film metal electrode 15 containing the low work function substances 14b as shown in FIG. 34 was manufactured through the same manner as the above embodiments except that the thin-film metal electrode was formed of a major component Au and a minor component $Tb_4O_7$ of a low work function on the insulator layer. In this case, the co-sputtering was used and the resultant thin-film metal electrode had $2 \times 10^{-5}$ $\Omega cm$.

Then, there was measured the diode current Id and the emission current Ie corresponding to the film thickness of the $SiO_2$ insulator layer.

Figure 35:
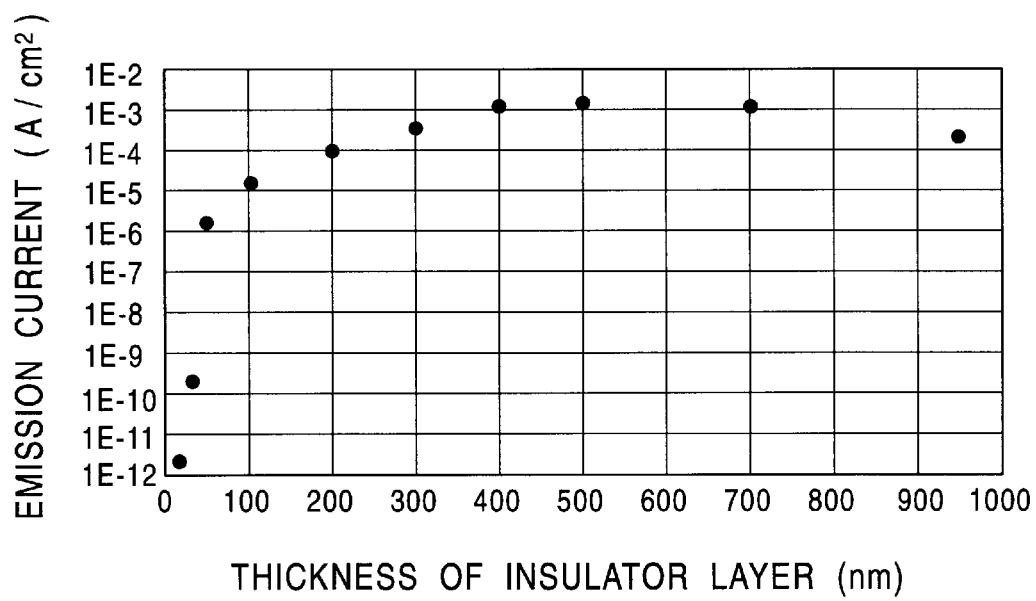
FIG. 35 is a graph illustrating a dependency of the electron emission current on the film thickness of an $SiO_2$ insulator layer in the electron emission device shown in FIG. 34.
Figure 36:
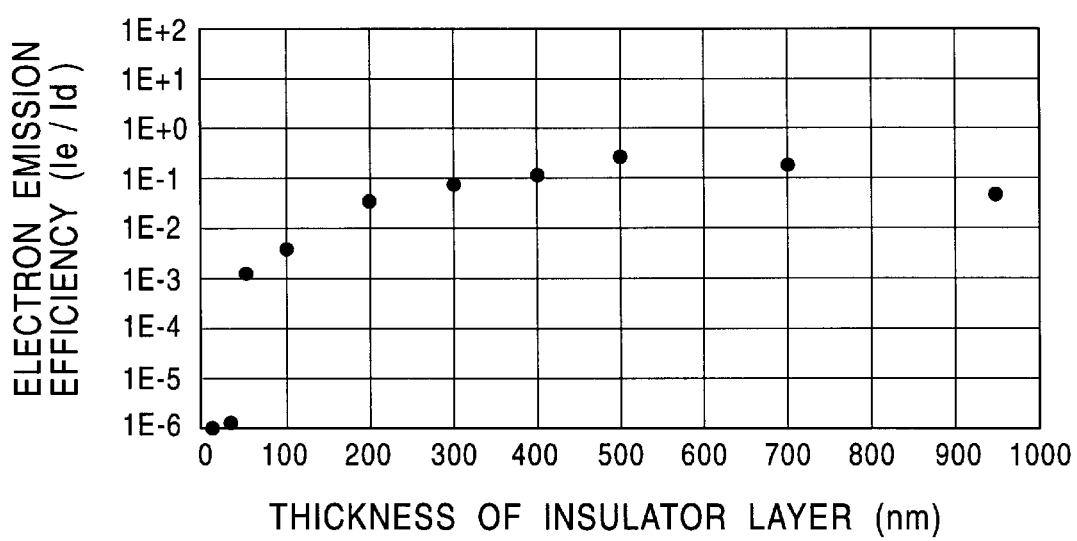
FIG. 36 is a graph showing a dependency of the electron emission efficiency on the film thickness of the $SiO_2$ insulator layer in the electron emission device shown in FIG. 34.

In the case that a driving voltage Vd of 0 to 100 V was applied to the prepared electron emission devices, FIGS. 35 and 36 show relationships between a film thickness of insulator layer and both the maxim emission current Ie and the maxim electron emission efficiency (Ie/Id) in the electron emission device respectively. As apparent from these Figures, the device whose insulator layer having a thickness of 400 to 700 nm showed the maximum emission current of about $1\times10^{-3}$ A/cm$^2$ and the maximum electron emission efficiency of about $1\times10^{-1}$. To obtain a good electron emission efficiency, it is understood that the insulator layer has a film thickness of 50 nm or greater.

Figure 37:
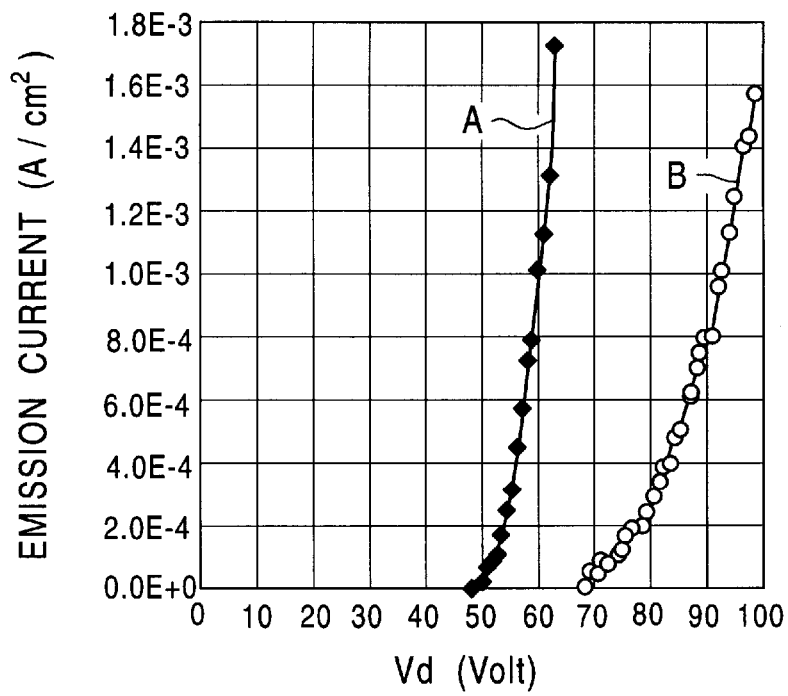
FIG. 37 is a graph illustrating a relationship between the diode current Id for driving the device and the emission current Ie in the electron emission device shown in FIG. 34.

FIG. 37 shows a property relationship between the emission current Ie and the driving voltage Vd of the electron emission devices both of the embodiment and the comparative electron emission when a driving voltage Vd of 0 to 100 V was applied to each prepared electron emission device. In Figure, the plot A denotes a property of emission current of the embodiment having the thin-film metal electrode containing the low work function substances and, the plots B denote that of the comparative device assembled in the same manner except that non-low work function substance is provided. As seen from FIG. 37, the device having the thin-film metal electrode containing the low work function substances began to emit electrons at a driving voltage Vd of about 50 V. In contrast, the device without any low work function substance began to emit electrons at a driving voltage Vd of about 70 V or more. In this way, it is understood that the driving voltage of the electron emission device having the low work function substance in the thin-film metal electrode is reduced in comparison with the comparative.

Figure 38:
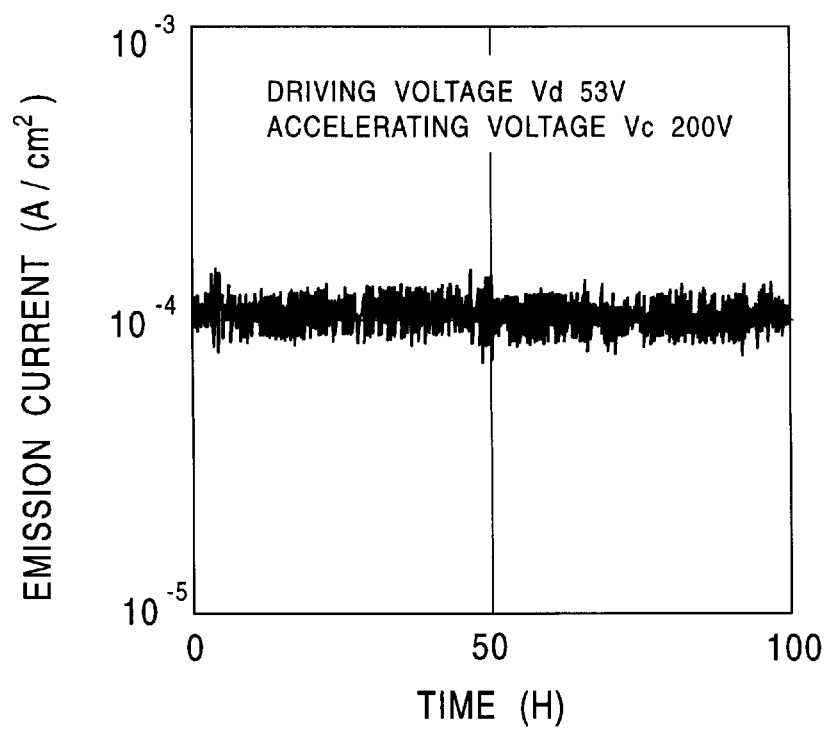
FIG. 38 is a graph illustrating a fluctuation of emission current with the lapse of time in the electron emission device shown in FIG. 20.
Figure 39:
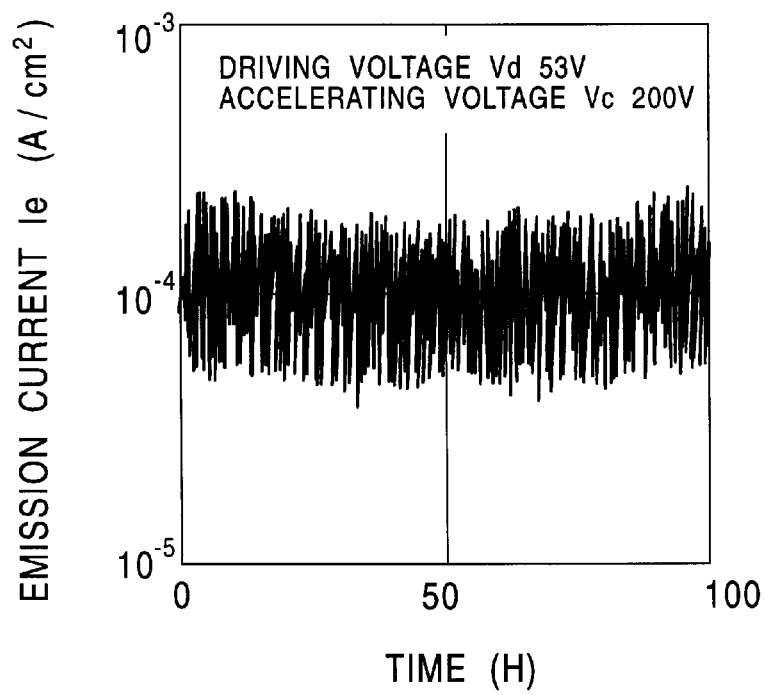
FIG. 39 is a graph illustrating a fluctuation of emission current with the lapse of time in a comparative electron emission device which has no region containing atomic elements each having a work function which is lower than that of the thin-film metal electrode.

Moreover, fluctuations of the emission current Ie of the electron emission device both of the embodiment and the comparative device are measured. FIG. 38 shows the fluctuation of emission current with the lapse of time in the electron emission device having the low work function substance in the thin-film metal electrode. FIG. 39 shows the same of the comparative electron emission device without any low work function substance in the thin-film metal electrode. As apparent from these Figures, the fluctuations of the emission current Ie of the electron emission device of the embodiment is very small in comparison with that of the comparative device. It is assumed that this phenomenon occurs due to the thin-film metal electrode including the dispersed low work function substances is capable of facilitating to pass many elections from the electron supply layer to the thin-film metal electrode in stable in comparison with the comparative device without any low work function substance.

Figure 40:
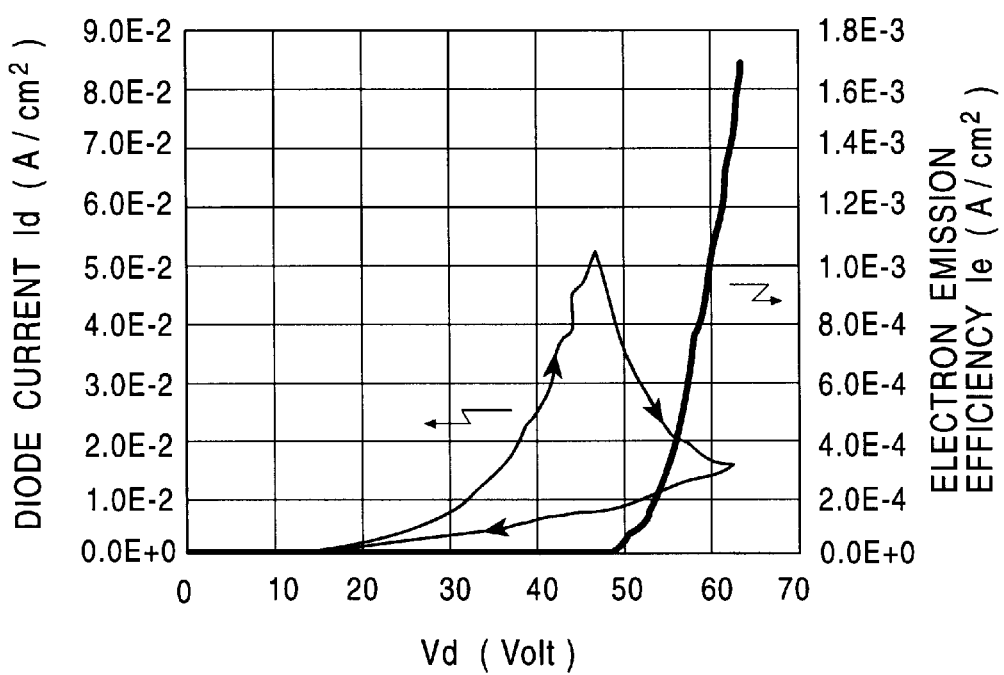
FIG. 40 is a graph illustrating relationships of both the diode current Id and the emission current Ie with respect to the driving voltage Vd applied for driving the electron emission device shown in FIG. 20.

FIG. 40 shows a property relationship of a diode current Id and the emission current Ie with respect to the driving voltage Vd of the electron emission device. From this, it is understood that the diode current Id shows a hysteresis property. In Figure, a voltage drop of diode current Id occurs at the starting point of the emission current Ie and then the emission current Ie rises.

<Electron Emission Device Including a Region Containing Atoms or Compounds of a Low Work Function Which is Formed within the Insulator Layer>

Figure 41:
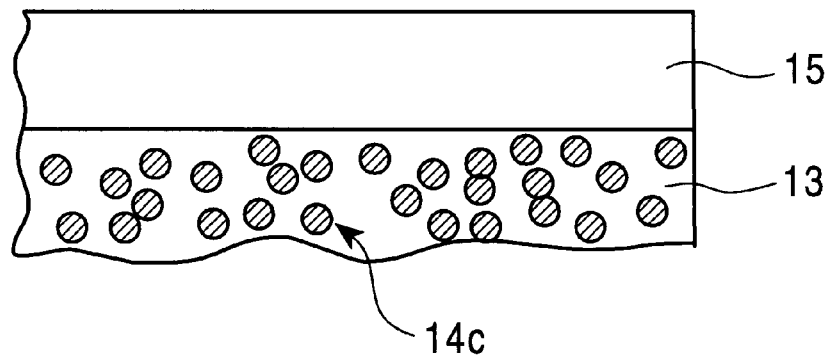
FIG. 41 is an partly enlarged schematic cross-sectional view showing an electron emission device of a further embodiment according to the invention in which the insulator layer has a region containing atomic elements each having a work function which is lower than that of the thin-film metal electrode.

FIG. 41 is an partly enlarged schematic cross-sectional view showing an electron emission device of another embodiment according to the invention in which the insulator layer 13 has a region 14c containing atomic elements each having a low work function. The electron emission device is manufactured through the same manner as the above embodiments except that the low work function regions 14c are disposed with in the insulator layer 13, instead of the intermediate layer 14 of Al—Li alloy or Tb$_4$O$_7$ disposed between the insulator layer 13 and the thin-film metal electrode 15 in the above embodiment shown in FIG. 26. In this case, the low work function regions 14c can facilitate to transfer electrons from the insulator layer 13 to the thin-film metal electrode 15. The low work function regions 14c may be formed in such a manner that the higher the concentration distribution of low work function substances becomes closer to the thin-film metal electrode 15. The thin-fim formtion of the insulator layer 13 with The low work function regions 14c is the same as that of the device shown in FIG. 34.

As mentioned above, in the electron emission device comprising an electron supply layer, an insulator layer and a thin-film metal electrode, the improvement of the performance and stableness is achieved by proving a region containing atomic elements each having a work function such as the group I i.e., alkaline metals, the group II i.e., alkaline-earth metals, lanthanoids i.e., rare-earth elements or compounds combined thereto within one of the thin-film metal electrode and the insulator layer or therebetween.

<Electron Emission Device Including an Insulator Layer having a Thermal Conductive Layers>

Figure 42:
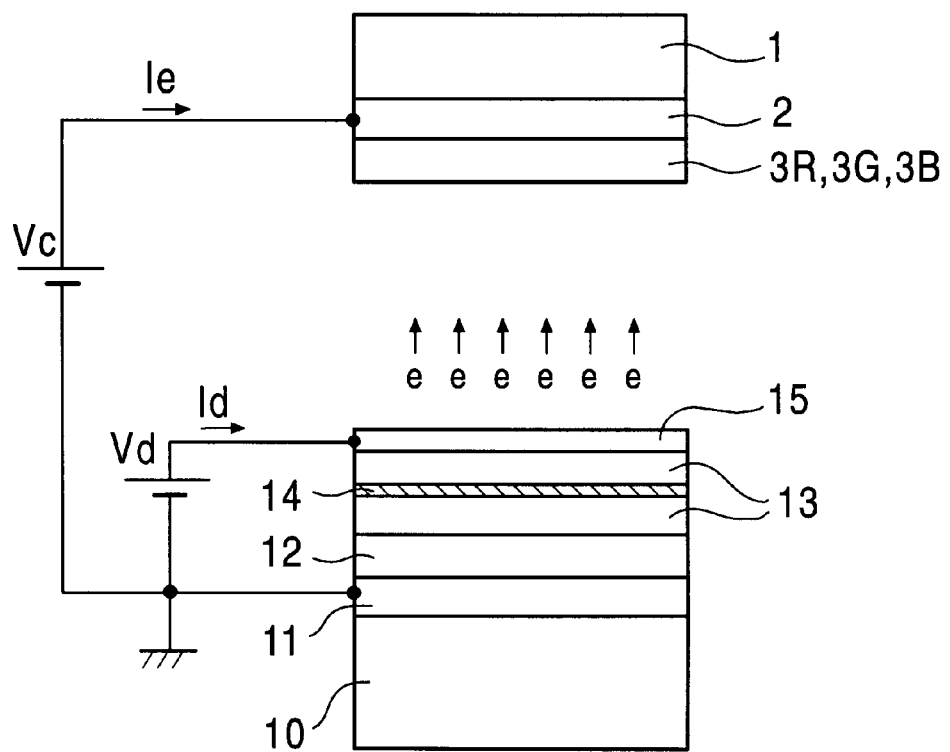
FIG. 42 is a schematic cross-sectional view showing an electron emission device of a still further embodiment according to the invention in which a thermal conductive layer is provided within the insulator layer.

As shown in FIG. 42, an electron emission device of this embodiment has an electron supply layer 12 of metal or semiconductor, an insulator layer 13 with a thermal conductive layer 14, and a thin-film metal electrode 15 facing a vacuum space which are layered or formed in turn on an ohmic electrode 11 of Al previously formed on a device substrate 10. The insulator layer 13 is made of a dielectric substance and has a very large film thickness of 50 nm or greater. The electron emission device is a diode with the top electrode i.e., the thin-film metal electrode 15 set to a positive potential Vd and the back electrode i.e., the ohmic electrode 11 set to a ground potential. The electron emission device emits electrons when an electric field is applied between the electron supply layer and the thin-film metal electrode. When the driving voltage Vd is applied between the ohmic electrode 11 and the thin-film metal electrode 15 to supply electrons into the electron supply layer 12, a diode current Id flows. Since the insulator layer 13 has a high resistance, most of the applied electric field is applied to the insulator layer 13. The electrons move inside the insulator layer 13 toward the thin-film metal electrode 15. Some of the electrons that reach near the thin-film metal electrode 15 tunnel through the thin-film metal electrode 15, due to the strong electric field, to be discharged out into the vacuum space. The electrons e (emission current Ie) discharged from the thin-film metal electrode 15 by the tunnel effect are accelerated by a high voltage Vc, which is applied to the opposing transparent collector electrode 2, and is collected at the collector electrode 2. When the fluorescent substance is coated on the collector electrode 2, corresponding visible light is emitted.

For the material of the thermal conductive layer 14 provided within the insulator layer, a substance i.e., metal, metal oxide, or alloy having a good thermal conductivity higher than that of the insulator layer such as Ag, Al, Al$_2$O$_3$, Au, Be, BeO, C, Ca, Cd, CdS, Cr, Cu, Fe, In, InSb, Ir, K, Li, Mg, Mo, NH$_4$Cl, Na, Nb, Ni, NiO, Pb, Pt, Rh, Sb, Si, Sn, Ta, Ti, TiO$_2$, Tl, TlCl, W, Zn, Zr, brass, Manganin™, Constantan, stainless steel, nichrome, Inconel, Monel, Pt-10% Rhodium can be used.

Electron emission devices of this embodiment were fabricated and their characteristics were examined concretely.

An electron supply layer of silicon (Si) was formed at 5000 nm thick, by sputtering, on an electrode surface of a device substrate 10 of glass on which an ohmic electrode of Al was previously formed 300 nm thick by sputtering. A plurality of Si substrates of this type were prepared.

Then, insulator layers of SiO$_2$ were formed on the electron supply layers of the Si substrate by sputtering respectively while changing the film thickness of the insulator layer in a range from 0 nm to 500 nm. Thus a plurality of $SiO_2$-insulator substrates were provided. Each $SiO_2$ insulator layer was formed by sputtering by using a gas of Ar, Kr or Xe or a mixture thereof, or a gas mixture essentially consisting of one of those rare gases with $O_2$, $N_2$, $H_2$ or the like mixed therein, under the sputtering conditions of a gas pressure of 0.1 to 100 mTorr, preferably 0.1 to 20 mTorr and the forming rate of 0.1 to 1000 nm/min, preferably 0.5 to 100 nm/min. To obtain the single layer or multilayer structure, the amorphous or crystal phase, the grain size and the atomic ratio of the goal insulator layer 13, the sputtering device was controlled by properly altering the sputtering target and sputtering conditions. A thermal conductive layer of Al was formed at a 10 nm thick by sputtering at the intermediate point during sputtering of the insulator layer so as to be sandwiched therebetween.

The thickness of the thermal conductive layer may be set within a range less than that of the insulator layer and 1 nm or more.

Finally, a thin-film metal electrode of Pt was formed at a 10 nm thick on the surface of the amorphous $SiO_2$ layer of each substrate by sputtering, thus providing plural device substrates.

Meanwhile, transparent substrates were prepared, each of which has ITO collector electrodes formed inside the transparent glass substrate. Fluorescent layers of fluorescent substances corresponding to Red, Green and Blue color emissions were formed on the collector electrodes by the normal scheme respectively.

Electron emission devices were assembled by holding those device substrates and transparent substrates apart from one another by 10 mm in parallel by a spacer in such a way that the thin-film metal electrode faced the collector electrode, with the clearance therebetween made to a vacuum of $10^{-7}$ Torr or $10^{-5}$ Pa.

Then, the diode current Id and the emission current Ie corresponding to the thickness of the $SiO_2$ film of each of the acquired plural devices were measured.

Figure 43:
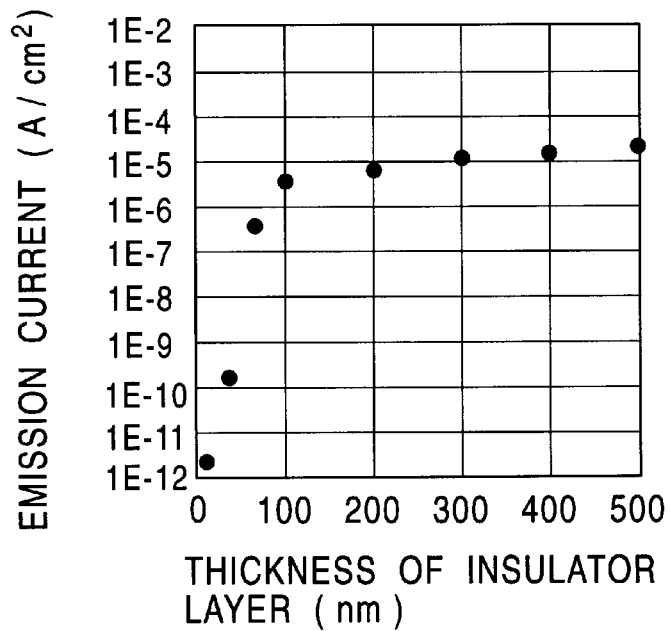
FIG. 43 is a graph illustrating a dependency of the electron emission current on the film thickness of an $SiO_2$ insulator layer in an electron emission device embodying the invention.
Figure 44:
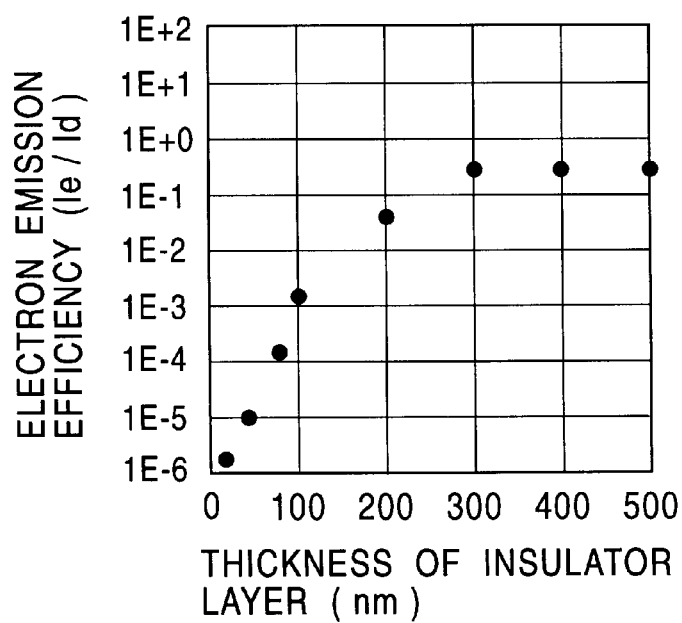
FIG. 44 is a graph showing a dependency of the electron emission efficiency on the film thickness of the $SiO_2$ insulator layer in the electron emission device embodying the invention.

FIGS. 43 and 44 show the relationships both between the film thickness of each $SiO_2$ layer and the maximum emission current Ie and between that film thickness and the maximum electron emission efficiency (Ie/Id) for each film thickness respectively when a driving voltage Vd of 0 to 200 V was applied to the prepared electron emission devices. As apparent from these Figures, while the emission current and the electron emission efficiency were saturated from the thickness of 50 nm, the devices whose $SiO_2$ layers had thicknesses of 300 to 500 nm showed the maximum emission current of about $1\times10^{-5}$ A/cm² and the maximum electron emission efficiency of about $1\times10^{-1}$.

Figure 45:
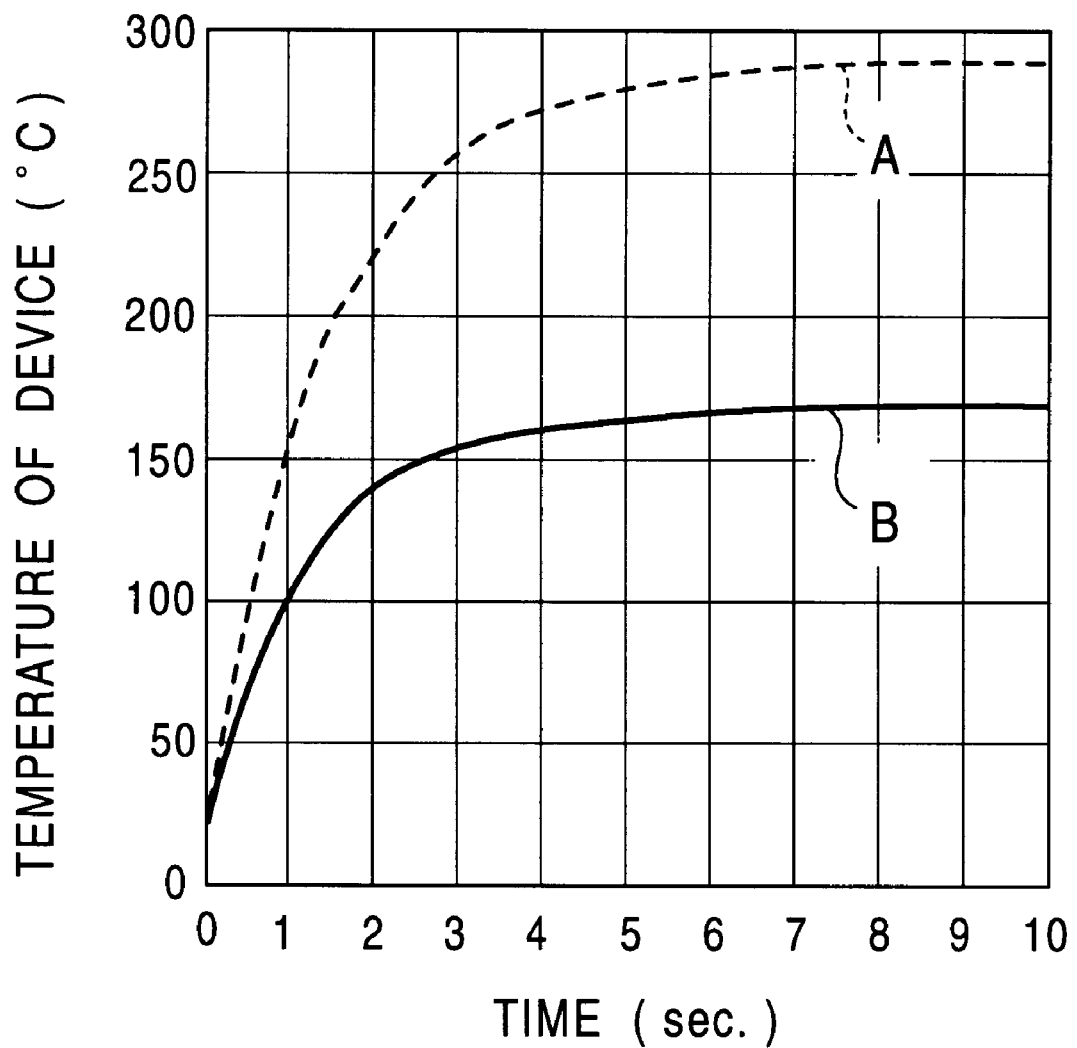
FIG. 45 is a graph showing changes in temperature of the electron emission device with the lapse of time in an embodiment according to the invention as well as an comparative electron emission device which has no thermal conductive layer.

The temperature of resultant electron emission device was measured for 10 seconds or more. After some comparative electron emission devices were fabricated in the same manner of this embodiment except that there is no thermal conductive layer in the insulator layer, the temperature of resultant electron emission device was measured similarly. FIG. 45 shows the results that both of the electron emission device of this embodiment and the comparative change in temperature with the lapse of time. In Figure, the curve A denotes a temperature property of the device having the thermal conductive layer in the insulator layer, and the curve B denotes that of thermal conductive layer. As seen from this Figure, the device of the embodiment having the thermal conductive layer is stable at a low temperature in comparison with the device without any thermal conductive layer.

Figure 46A:
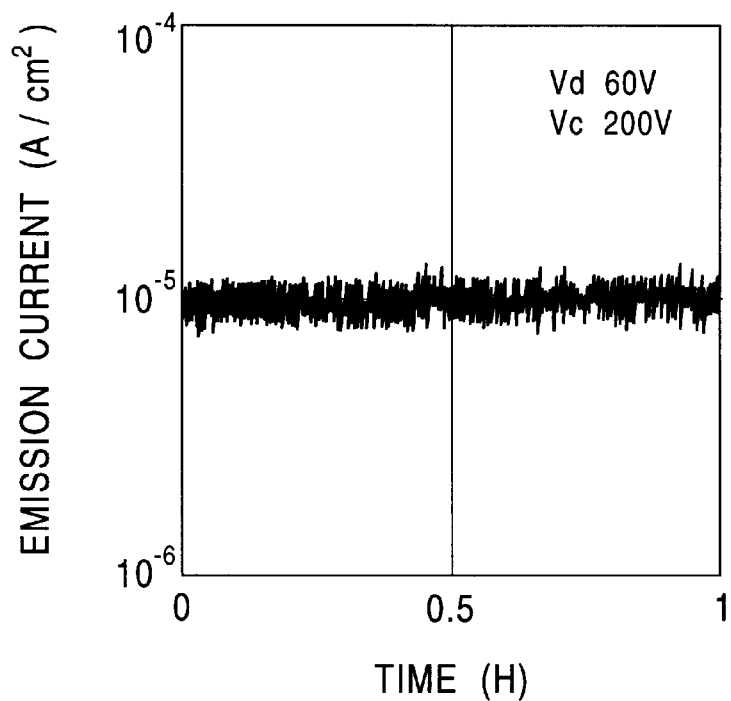
FIGS. 46A and 46B are graphs illustrating fluctuations of emission current with the lapse of time in the electron emission device of the embodiment having a thermal conductive layer provided within the insulator layer and the comparative electron emission device respectively.
Figure 46B:
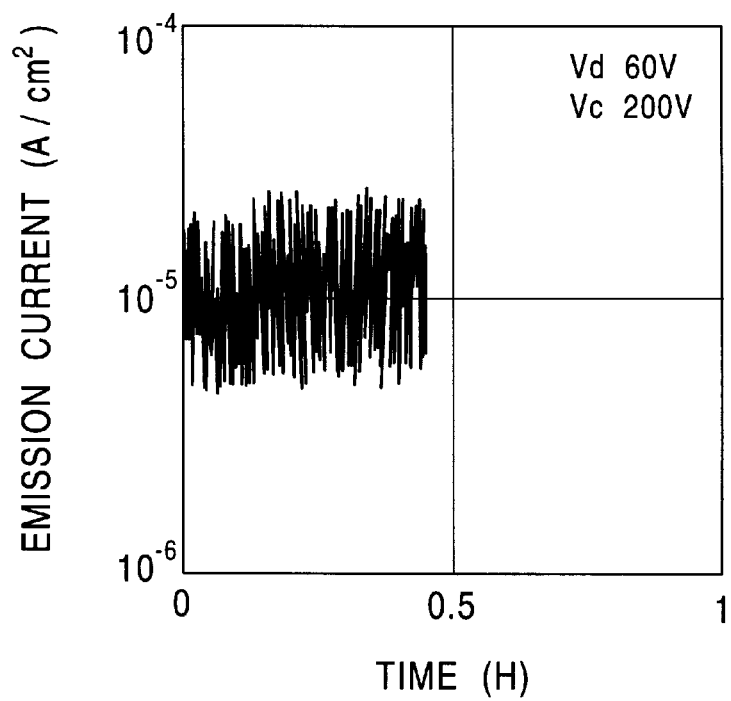

Moreover, fluctuations of the emission current Ie of the electron emission device both of the embodiment and the comparative are measured. FIG. 46A shows the fluctuation of emission current with the lapse of time in the electron emission device having a thermal conductive layer, and FIG. 46B shows the same of the comparative electron emission device having no thermal conductive layer. As apparent from these Figures, the thermal conductive layer disposed in the insulator layer of the electron emission device can restrict the fluctuation of Ie to make the emission current of the electron emission device stable in comparison with the comparative. Further, it is understood that the embodiment has a life longer than tat of the comparative which is broken during this examination.

<Electron Emission Display Device>

Figure 47:
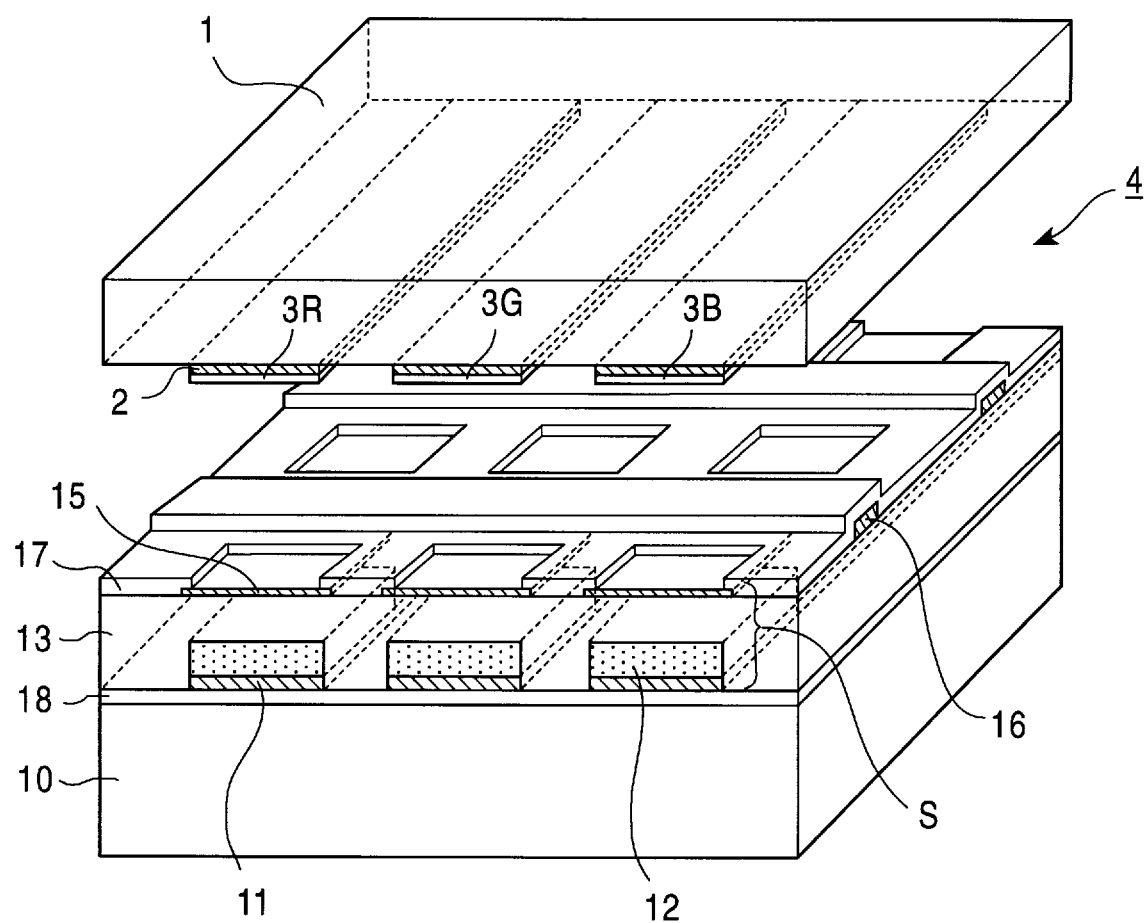
FIG. 47 is a schematic perspective view showing an electron emission display device according to one embodiment of the invention.

FIG. 47 shows an electron emission display device according to one embodiment of the invention. This embodiment comprises a pair of the transparent substrate 1 and the device substrate 10, which face each other with a vacuum space 4 in between. In the illustrated electron emission display apparatus, a plurality of transparent collector electrodes 2 of, for example, an indium tin oxide (so-called ITO), tin oxide (SnO), zinc oxide (ZnO) or the like, are formed in parallel on the inner surface of the transparent glass substrate 1 or the display surface (which faces the back substrate 10). The collector electrodes 2 may be formed integrally. The transparent collector electrodes which trap emitted electrons are arranged in groups of three in association with red (R), green (G) and blue (B) color signals in order to provide a color display panel, and voltages are applied to those three collector electrodes respectively. Therefore, fluorescent layers 3R, 3G and 3B of fluorescent substances corresponding to R, G and B color emissions are respectively formed on the three collector electrodes 2 in such a way as to face the vacuum space 4.

A plurality of ohmic electrodes 11 are formed in parallel on the inner surface of the device substrate 10 of glass or the like which faces the transparent glass substrate 1 with the vacuum space 4 in between (i. e., said inner surface faces the transparent glass substrate 1) via an auxiliary insulator layer 18. The auxiliary insulator layer 18 is comprised of an insulator such as $SiO_2$, $SiN_x$, $Al_2O_3$ or AlN, and serves to prevent an adverse influence of the device substrate 10 on the device (such as elution of an impurity such as an alkaline component or a roughened substrate surface). A plurality of electron emission devices S are formed on the ohmic electrodes 11. In order to adjoining thin-film metal electrodes 15 are electrically connected to each other, a plurality of bus electrodes 16 are formed on parts of the thin-film metal electrodes 15, extending in parallel to one another and perpendicular to the ohmic electrodes 11. Each electron emission device S comprises the electron supply layer 12, the insulator layer 13 and the thin-film metal electrode 15 which are formed in order on the associated ohmic electrode 11.

The thin-film metal electrodes 15 face the vacuum space 4. A second auxiliary insulator layer 17 with openings is formed to separate the surfaces of the thin-film metal electrodes 15 into a plurality of electron emission regions. This second auxiliary insulator layer 17 covers the bus electrodes 16 to prevent unnecessary short-circuiting.

The material for the ohmic electrodes 11 is Au, Pt, Al, W or the like which is generally used for the wires of an IC, and has a uniform thickness for supplying substantially the same current to the individual devices.

While silicon (Si) is one material for the electron supply layer 12, it is not restrictive for the electron supply layer of the invention and other semiconductors or metals of any of amorphous, polycrystal and monocrystal can be used as well.

From the principle of electron emission, it is better that the material for the thin-film metal electrode 15 has a lower work function φ and is thinner. To increase the electron emission efficiency, the material for the thin-film metal electrode 15 should be a metal of the group I or group II in the periodic table; for example, Cs, Rb, Li, Sr, Mg, Ba, Ca and the like are effective and alloys of those elements may be used as well. To make the thin-film metal electrode 15 very thin, the material for the thin-film metal electrode 15 should be a chemically stable metal with a high conductivity; for example, single substances of Au, Pt, Lu, Ag and Cu or alloys thereof are desirable. It is effective to coat or dope a metal with a low work function as described above on or in those metals.

The material for the bus electrodes 16 can be Au, Pt, Al or the like which is generally used for the wiring of an integrated circuit IC, and should have a thickness enough to supply substantially the same potential to the individual devices, adequately of 0.1 to 50 μm.

A simple matrix system or an active matrix system may be employed as the driving system for the display device of the invention.

In the electron emission display device according to the invention as shown in FIG. 47, it should be understood that the intermediate layer (not shown) is formed between the insulator layer 13 and the thin-film metal electrodes 15, and that the electron emission layer (not shown) is formed on the thin-film metal electrodes 15, and that a region containing atoms or compounds of a low work function (not shown) is formed within the insulator layer 13 or the thin-film metal electrodes 15, and that the thermal conductive layer (not shown) is formed within the insulator layer 13. Furthermore, a plurality of thermal conductive layers may be formed within the insulator layer 13, although the above embodiment is described for only a single thermal conductive layer to simplify the examination of the device. In addition, other functional layer such as Si, $SiO_x$ may be also formed in the form of plural layers laminated to one another.

What is claimed is:

1. An electron emission device comprising:
    an electron supply layer of metal or semiconductor;
    an insulator layer formed on the electron supply layer; and
    a thin-film metal electrode formed on the insulator layer and facing a vacuum space,
    characterized in that said insulator layer is made of a dielectric substance and has a film thickness of 50 nm or greater, whereby the electron emission device emits electrons when an electric field is applied between the electron supply layer and the thin-film metal electrode.
2. An electron emission display device comprising:
    a pair of first and second substrates facing each other with a vacuum space in between;
    a plurality of electron emission devices provided on the first substrate;
    a collector electrode provided in the second substrate; and
    a fluorescent layer formed on the collector electrode,
    each of the electron emission devices comprising an electron supply layer of metal or semiconductor; an insulator layer formed on the electron supply layer; and a thin-film metal electrode formed on the insulator layer and facing a vacuum space, wherein said insulator layer is made of a dielectric substance and has a film thickness of 50 nm or greater.
3. An electron emission display device comprising:
    a pair of a device substrate and a transparent substrate facing each other with a vacuum space in between;
    a plurality of ohmic electrodes formed in parallel on an inner surface of the device substrate;
    a plurality of electron emission devices provided on the ohmic electrodes, each of the electron emission devices comprising an electron supply layer of metal or semiconductor; an insulator layer formed on the electron supply layer; and a thin-film metal electrode formed on the insulator layer and facing the vacuum space, wherein said insulator layer is made of a dielectric substance and has a film thickness of 50 nm or greater;
    a plurality of bus electrodes formed on parts of the thin-film metal electrodes and extending in parallel to one another and perpendicular to the ohmic electrodes so as to electrically connect adjoining thin-film metal electrodes;
    a plurality of collector electrodes provided in the transparent substrate; and
    fluorescent layers formed on the collector electrodes.
4. An electron emission display device according to claim 3 further comprising a second auxiliary insulator layer with openings formed to separate the surfaces of the thin-film metal electrodes into a plurality of electron emission regions.
5. An electron emission display device according to claim 4, wherein the second auxiliary insulator layer covers the bus electrodes.
6. An electron emission device comprising:
    an electron supply layer of metal or semiconductor;
    an insulator layer formed on the electron supply layer; and
    a thin-film metal electrode formed on the insulator layer and facing a vacuum space,
    characterized in that said insulator layer is made of a dielectric substance with a dielectric constant of 8 or less and has a film thickness of 50 nm or greater, whereby the electron emission device emits electrons when an electric field is applied between the electron supply layer and the thin-film metal electrode.
7. An electron emission display device comprising:
    a pair of first and second substrates facing each other with a vacuum space in between;
    a plurality of electron emission devices provided on the first substrate;
    a collector electrode provided in the second substrate; and
    a fluorescent layer formed on the collector electrode,
    each of the electron emission devices comprising an electron supply layer of metal or semiconductor; an insulator layer formed on the electron supply layer; and a thin-film metal electrode formed on the insulator layer and facing a vacuum space, wherein said insulator layer is made of a dielectric substance with a dielectric constant of 8 or less and has a film thickness of 50 nm or greater.
8. An electron emission device comprising:
    an electron supply layer of metal or semiconductor;
    an insulator layer formed on the electron supply layer; and
    a thin-film metal electrode formed on the insulator layer and facing a vacuum space,
    characterized in that said insulator layer has a film thickness of 50 nm or greater and said electron supply layer is transparent, whereby the electron emission device emits electrons when an electric field is applied between the electron supply layer and the thin-film metal electrode.

9. An electron emission display device comprising:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor; an insulator layer formed on the electron supply layer; and a thin-film metal electrode formed on the insulator layer and facing a vacuum space, wherein said insulator layer has a film thickness of 50 nm or greater and said electron supply layer is transparent.

10. An electron emission display device according to claim 9, wherein said first substrate is transparent, and further comprising a transparent electrode which is disposed between said first substrate and said electron supply layer.

11. An electron emission device comprising:

an electron supply layer of metal or semiconductor;

an insulator layer formed on the electron supply layer; and a thin-film metal electrode formed on the insulator layer and facing a vacuum space, characterized in that said insulator layer is made of silicon oxide as a major component of $SiO_x$ where x represents an atomic ratio in a range of from 0.5 to 2 in a whole layer and has a film thickness of 50 nm or greater, whereby the electron emission device emits electrons when an electric field is applied between the electron supply layer and the thin-film metal electrode.

12. An electron emission device comprising:

an electron supply layer of metal or semiconductor;

an insulator layer formed on the electron supply layer; and a thin-film metal electrode formed on the insulator layer and facing a vacuum space, characterized in that said insulator layer is made of silicon oxide as a major component of $SiO_x$ where x represents an atomic ratio satisfying a refractive index in a range of from 1.3 to 3.0 and has a film thickness of 50 nm or greater, whereby the electron emission device emits electrons when an electric field is applied between the electron supply layer and the thin-film metal electrode.

13. An electron emission display device comprising:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor; an insulator layer formed on the electron supply layer; and a thin-film metal electrode formed on the insulator layer and facing a vacuum space, wherein said insulator layer is made of silicon oxide as a major component of $SiO_x$ where x represents an atomic ratio in a range of from 0.5 to 2 in a whole layer and has a film thickness of 50 nm or greater.

14. An electron emission display device comprising:

a pair of a device substrate and a transparent substrate facing each other with a vacuum space in between;

a plurality of ohmic electrodes formed in parallel on an inner surface of the device substrate;

a plurality of electron emission devices provided on the ohmic electrodes, each of the electron emission devices comprising an electron supply layer of metal or semiconductor; an insulator layer formed on the electron supply layer; and a thin-film metal electrode formed on the insulator layer and facing the vacuum space, wherein said insulator layer is made of silicon oxide as a major component of $SiO_x$ where x represents an atomic ratio in a range of from 0.5 to 2 in a whole layer and has a film thickness of 50 nm or greater;

a plurality of bus electrodes formed on parts of the thin-film metal electrodes and extending in parallel to one another and perpendicular to the ohmic electrodes so as to electrically connect adjoining thin-film metal electrodes;

a plurality of collector electrodes provided in the transparent substrate; and fluorescent layers formed on the collector electrodes.

15. An electron emission display device according to claim 14 further comprising a second auxiliary insulator layer with openings formed to separate the surfaces of the thin-film metal electrodes into a plurality of electron emission regions.

16. An electron emission display device according to claim 15, wherein the second auxiliary insulator layer covers the bus electrodes.

17. An electron emission display device comprising:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor; an insulator layer formed on the electron supply layer; and a thin-film metal electrode formed on the insulator layer and facing a vacuum space, wherein one of said thin-film metal electrode and said insulator layer is provided with a region containing atomic elements each having a work function which is lower than that of said thin-film metal electrode.

18. An electron emission device comprising:

an electron supply layer of metal or semiconductor;

an insulator layer formed on the electron supply layer; and a thin-film metal electrode formed on the insulator layer and facing a vacuum space, characterized in that said insulator layer has a film thickness of 50 nm or greater and is provided with one or more thermal conductive layers, whereby the electron emission device emits electrons when an electric field is applied between the electron supply layer and the thin-film metal electrode.

19. An electron emission display device comprising:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor; an insulator layer formed on the electron supply layer; and a thin-film metal electrode formed on the insulator layer and facing a vacuum space, wherein said insulator layer has a film thickness of 50 nm or greater and is provided with one or more thermal conductive layers.

20. An electron emission device comprising:

an electron supply layer of metal or semiconductor;

an insulator layer formed on the electron supply layer; and a thin-film metal electrode formed on the insulator layer and facing a vacuum space, characterized in that said insulator layer is made of a dielectric substance and has a film thickness of 50 nm or greater which is formed through a sputtering by using a mixture gas essentially comprising a rare gas under a sputtering condition of a gas pressure of 0.1 to 100 mTorr and a forming rate of 0.5 to 100 nm/min, whereby the electron emission device emits electrons when an electric field is applied between the electron supply layer and the thin-film metal electrode.

21. An electron emission display device comprising:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor; an insulator layer formed on the electron supply layer; and a thin-film metal electrode formed on the insulator layer and facing a vacuum space, wherein said insulator layer is made of a dielectric substance and has a film thickness of 50 nm or greater which is formed through a sputtering by using a mixture gas essentially comprising a rare gas under a sputtering condition of a gas pressure of 0.1 to 100 mTorr and a forming rate of 0.5 to 100 nm/min.

22. An electron emission display device comprising:

a pair of a device substrate and a transparent substrate facing each other with a vacuum space in between;

a plurality of ohmic electrodes formed in parallel on an inner surface of the device substrate;

a plurality of electron emission devices provided on the ohmic electrodes, each of the electron emission devices comprising an electron supply layer of metal or semiconductor; an insulator layer formed on the electron supply layer; and a thin-film metal electrode formed on the insulator layer and facing the vacuum space, wherein said insulator layer is made of a dielectric substance and has a film thickness of 50 nm or greater which is formed through a sputtering by using a mixture gas essentially comprising a rare gas under a sputtering condition of a gas pressure of 0.1 to 100 mTorr and a forming rate of 0.5 to 100 nm/min;

a plurality of bus electrodes formed on parts of the thin-film metal electrodes and extending in parallel to one another and perpendicular to the ohmic electrodes so as to electrically connect adjoining thin-film metal electrodes;

a plurality of collector electrodes provided in the transparent substrate; and fluorescent layers formed on the collector electrodes.

23. An electron emission display device according to claim 22 further comprising a second auxiliary insulator layer with openings formed to separate the surfaces of the thin-film metal electrodes into a plurality of electron emission regions.

24. An electron emission display device according to claim 23, wherein the second auxiliary insulator layer covers the bus electrodes.

* * * * *